(12) United States Patent
Taki et al.

(10) Patent No.: US 12,394,248 B2
(45) Date of Patent: Aug. 19, 2025

(54) INFORMATION PROCESSING DEVICE AND INFORMATION PROCESSING METHOD FOR SPECIFYING PARTS RELATED TO BODY MOTION

(71) Applicant: SONY GROUP CORPORATION, Tokyo (JP)

(72) Inventors: Yuhei Taki, Tokyo (JP); Junichi Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 537 days.

(21) Appl. No.: 17/757,422

(22) PCT Filed: Dec. 11, 2020

(86) PCT No.: PCT/JP2020/046214
§ 371 (c)(1),
(2) Date: Jun. 15, 2022

(87) PCT Pub. No.: WO2021/131772
PCT Pub. Date: Jul. 1, 2021

(65) Prior Publication Data
US 2023/0012053 A1    Jan. 12, 2023

(30) Foreign Application Priority Data

Dec. 24, 2019   (JP) .................................. 2019-232838

(51) Int. Cl.
*G06V 40/20* (2022.01)
*G06F 3/01* (2006.01)
(Continued)

(52) U.S. Cl.
CPC .............. *G06V 40/20* (2022.01); *G06F 3/011* (2013.01); *G06F 3/16* (2013.01); *G06T 7/13* (2017.01);
(Continued)

(58) Field of Classification Search
CPC .... G06V 40/20; G06V 10/98; G06V 2201/07; G06V 10/422; G06V 40/10; G06F 3/011;
(Continued)

(56) References Cited

U.S. PATENT DOCUMENTS

| 9,573,105 B2 * | 2/2017 | Herbst ..................... B01J 8/003 |
| 2004/0155962 A1 | 8/2004 | Marks |

(Continued)

FOREIGN PATENT DOCUMENTS

| CN | 1764931 A | 4/2006 |
| CN | 103038727 A | 4/2013 |

(Continued)

OTHER PUBLICATIONS

International Search Report and Written Opinion of PCT Application No. PCT/JP2020/046214, issued on Feb. 9, 2021, 10 pages of ISRWO.

*Primary Examiner* — Siamak Harandi
(74) *Attorney, Agent, or Firm* — CHIP LAW GROUP

(57) ABSTRACT

An information processing device according to the present disclosure includes: an acquisition unit that acquires outline information indicating an outline of a user who makes a body motion; and a specification unit that specifies, among body parts, a main part corresponding to the body motion and a related part, which is to be a target of correction processing of motion information corresponding to the body motion, on the basis of the outline information acquired by the acquisition unit.

20 Claims, 14 Drawing Sheets

(51) Int. Cl.
*G06F 3/16* (2006.01)
*G06T 7/13* (2017.01)
*G06T 7/20* (2017.01)
*G06T 13/40* (2011.01)
*G06V 10/98* (2022.01)
*G10L 15/18* (2013.01)

(52) U.S. Cl.
CPC ............... *G06T 7/20* (2013.01); *G06T 13/40* (2013.01); *G06V 10/98* (2022.01); *G10L 15/1815* (2013.01); *G06T 2207/30196* (2013.01); *G06V 2201/07* (2022.01)

(58) Field of Classification Search
CPC . G06F 3/16; G06F 3/012; G06F 3/167; G06T 7/13; G06T 7/20; G06T 13/40; G06T 2207/30196; G10L 15/1815
See application file for complete search history.

(56) References Cited

U.S. PATENT DOCUMENTS

2011/0306398 A1* 12/2011 Boch ..................... A63F 13/52
463/7
2011/0317871 A1 12/2011 Tossell et al.

FOREIGN PATENT DOCUMENTS

| JP | 2002-042168 A | 2/2002 |
| JP | 2006-514366 A | 4/2006 |
| JP | 2013-535717 A | 9/2013 |
| JP | 2016-517557 A | 6/2016 |
| KR | 10-2005-0099547 A | 10/2005 |
| KR | 10-2013-0111248 A | 10/2013 |
| WO | 2004/072909 A1 | 8/2004 |
| WO | 2012/005893 A2 | 1/2012 |
| WO | 2016/167331 A1 | 10/2016 |

* cited by examiner

FIG.1
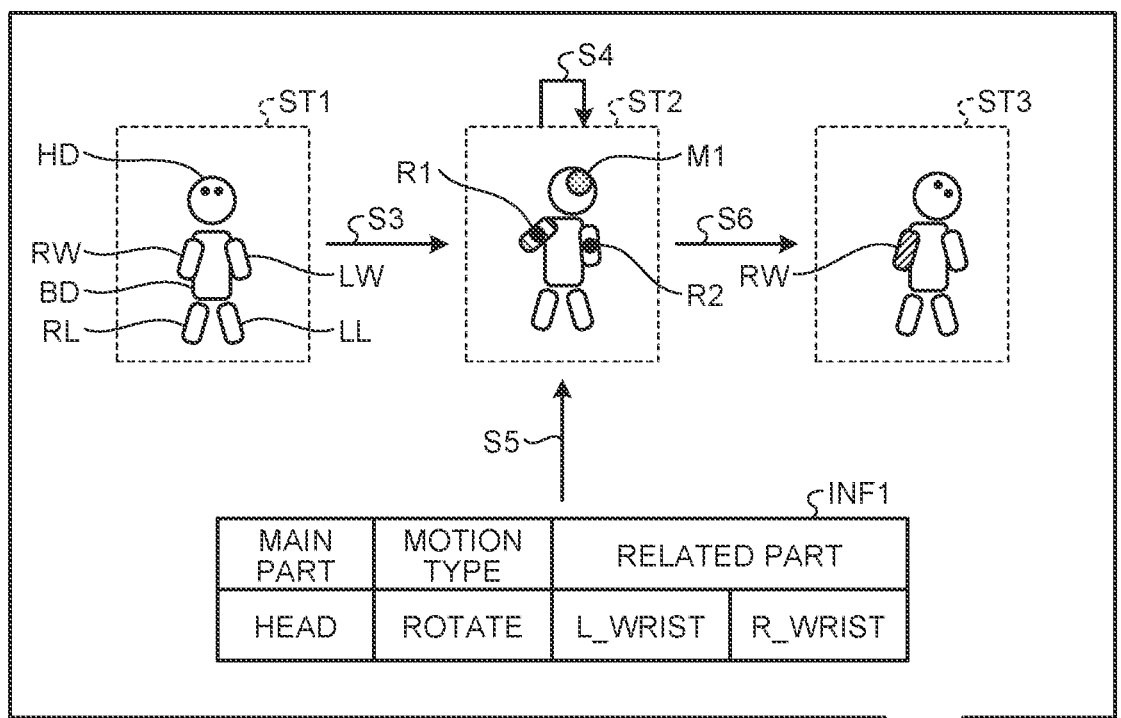
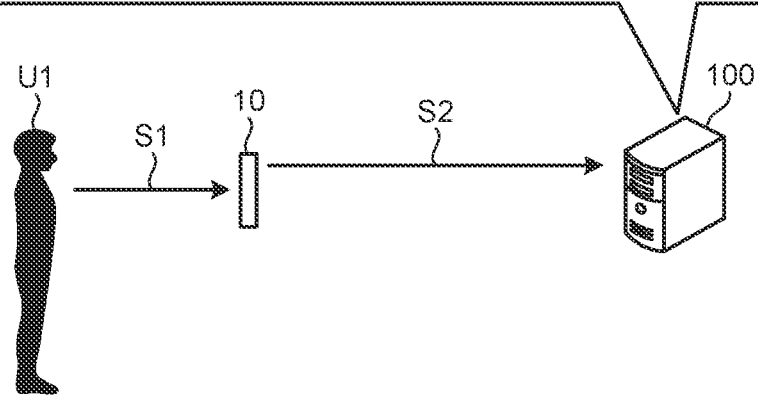

FIG.5

| MAIN PART | | | MOTION TYPE | RELATED PART | | | | |
|---|---|---|---|---|---|---|---|---|
| #1 | #2 | ... | | #1 | #2 | #3 | #4 | ... |
| HEAD | - | ... | ROTATE | L_WRIST | R_WRIST | - | - | ... |
| HEAD | - | ... | MOVE | L_WRIST | R_WRIST | L_LEG | R_LEG | ... |
| ... | ... | ... | ... | ... | ... | ... | ... | ... |

123

INFORMATION PROCESSING DEVICE AND INFORMATION PROCESSING METHOD FOR SPECIFYING PARTS RELATED TO BODY MOTION

CROSS REFERENCE TO RELATED APPLICATIONS

This application is a U.S. National Phase of International Patent Application No. PCT/JP2020/046214 filed on Dec. 11, 2020, which claims priority benefit of Japanese Patent Application No. JP 2019-232838 filed in the Japan Patent Office on Dec. 24, 2019. Each of the above-referenced applications is hereby incorporated herein by reference in its entirety.

FIELD

The present disclosure relates to an information processing device and an information processing method.

BACKGROUND

In recent years, a technology of performing various kinds of processing by using information related to a body motion (gesture) of a user is known. For example, a technology that uses a body motion of a user as an instruction to execute a function of equipment (operation of equipment) is known (for example, Patent Literature 1). Furthermore, a technology of generating content including a virtual character that makes a motion corresponding to a body motion of a user is known (for example, Patent Literature 2).

CITATION LIST

Patent Literature

Patent Literature 1: WO 2016/167331 A
Patent Literature 2: JP 2016-517557 A

SUMMARY

Technical Problem

According to the related art, a function of equipment is executed or content including a virtual character is generated by a body motion of a user.

However, in the related art, it is not always possible to appropriately specify a part related to the body motion of the user. For example, in the related art, motion information of a body part of the user is used without distinction of each part, such as whether the part is a main part a motion of which is intended by the user with respect to the body motion of the user. As a result, in a case of the related art, there is a possibility that a position change of a body part which change is not intended by the user is recognized as equipment operation by the user, or a motion of the virtual character becomes insufficient. Thus, it is desired to appropriately specify a part related to a body motion of the user.

Thus, the present disclosure proposes an information processing device and an information processing method capable of appropriately specifying a part related to a body motion of a user.

Solution to Problem

According to the present disclosure, an information processing device includes an acquisition unit that acquires outline information indicating an outline of a user who makes a body motion; and a specification unit that specifies, among body parts, a main part corresponding to the body motion and a related part, which is to be a target of correction processing of motion information corresponding to the body motion, on a basis of the outline information acquired by the acquisition unit.

BRIEF DESCRIPTION OF DRAWINGS

FIG. 1 is a view illustrating an example of information processing according to a first embodiment of the present disclosure.

FIG. 5 is a view illustrating an example of a part information storage unit according to the first embodiment of the present disclosure.

DESCRIPTION OF EMBODIMENTS

Figure 2:
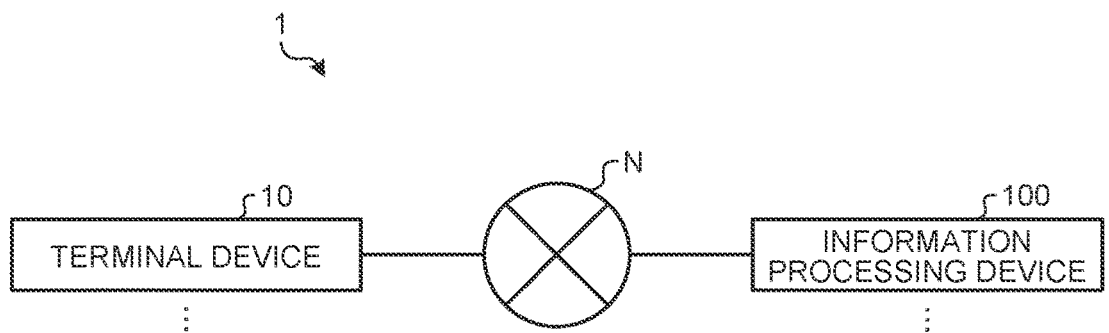
FIG. 2 is a view illustrating a configuration example of an information processing system according to the first embodiment of the present disclosure.

In the following, embodiments of the present disclosure will be described in detail on the basis of the drawings. Note that these embodiments do not limit an information processing device and an information processing method according to the present application. Also, in each of the following embodiments, overlapped description is omitted by assignment of the same reference sign to the same parts.

The present disclosure will be described in the following order of items.

1. First Embodiment
    1-1. Outline of information processing according to the first embodiment of the present disclosure 1-1-1. Background and effects
1-1-2. Application example
1-2. Configuration of an information processing system according to the first embodiment
1-3. Configuration of an information processing device according to the first embodiment
1-4. Configuration of a terminal device according to the first embodiment
1-5. Procedure of the information processing according to the first embodiment
1-5-1. Procedure of processing related to the Information processing device
1-5-2. Procedure of processing related to the information processing system
1-6. Example of part specification using speech
2. Second Embodiment
2-1. Outline of information processing according to the second embodiment
2-1-1. Background and effects
2-2. Configuration of an information processing device according to the second embodiment
2-3. Example of part specification using speech
2-4. Example of information utilization according to an attribute
2-5. Motion editing example
3. Other embodiments
3-1. Other configuration examples
3-2. Others
4. Effects according to the present disclosure
5. Hardware configuration

1. First Embodiment

1-1. Outline of Information Processing According to the First Embodiment of the Present Disclosure FIG. 1 is a view illustrating an example of information processing according to the first embodiment of the present disclosure. The information processing according to the first embodiment of the present disclosure is realized by an information processing system 1 (see FIG. 2) including an information processing device 100 and terminal device 10 illustrated in FIG. 1.

The information processing device 100 is an information processing device that executes the information processing according to the first embodiment. The information processing device 100 specifies a part corresponding to a body motion of a user on the basis of outline information indicating an outline of the user who makes the body motion. In the example of FIG. 1, a case where sensor information (image information) detected by an image sensor 171 of the terminal device 10 (see FIG. 6) used by the user is used as appearance information is illustrated. Note that a sensor that detects the outline information indicating the outline of the user is not limited to the image sensor 171, and may be any sensor as long as the outline information of the user can be detected. For example, the sensor that detects the outline information indicating the outline of the user may be an optical ranging sensor, an acoustic wave sensor using an ultrasonic wave, or the like. For example, the sensor that detects the outline information indicating the outline of the user may be a light detection and ranging or laser imaging detection and ranging (LiDAR) or time of flight (ToF) sensor, or the like. For example, the sensor that detects the outline information indicating the outline of the user may be a sensor that detects heat, such as a thermal sensor. As described above, as long as the outline information indicating the outline of the user can be detected, the information processing system 1 may detect the outline information by using any sensor.

Hereinafter, FIG. 1 will be specifically described. In the following, a case where a user U1 who uses the terminal device 10 performs an input to the terminal device 10 by making a body motion will be described as an example. First, in the example of FIG. 1, the terminal device 10 detects image information acquired by imaging of the user U1 by the image sensor 171 (Step S1). Then, the terminal device 10 transmits the detected image information as outline information to the information processing device 100 (Step S2). For example, the terminal device 10 transmits moving image information including a plurality of pieces of continuously captured image information to the information processing device 100 as the outline information. For example, the terminal device 10 transmits, as the outline information, moving image information including a plurality of frames to the information processing device 100.

As a result, the information processing device 100 acquires, as the outline information, the moving image information including the plurality of frames. The information processing device 100 acquires the outline information indicating the body motion of the user U1. In the example of FIG. 1, the information processing device 100 acquires, as the outline information, a plurality of pieces of image information such as image information corresponding to a state ST1 and image information corresponding to a state ST2. Note that the information processing device 100 may generate motion information corresponding to the body motion of the user between the state ST1 and the state ST2, or may acquire motion information corresponding to the body motion of the user between the state ST1 and the state ST2 from an external information processing device.

The information processing device 100 that acquires the outline information performs processing of specifying a part corresponding to the body motion of the user U1 by using the outline information. First, the information processing device 100 specifies a part corresponding to the body motion of the user U1 (hereinafter, also referred to as "main part") (Step S3). The information processing device 100 specifies, as the main part, a part having a large amount of change in the body motion of the user U1 between the state ST1 and the state ST2. In the example of FIG. 1, the information processing device 100 specifies, as a main part M1, a head HD that is a part having a large amount of change between the state ST1 and the state ST2 among body parts of the user U1. For example, the information processing device 100 extracts a difference between a first frame (first image information) corresponding to the state ST1 and a second frame (second image information) corresponding to the state ST2, and specifies the head HD, which is the part having the large amount of change, as the main part M1.

Furthermore, the information processing device 100 specifies a motion type of the user U1 between the state ST1 and the state ST2 (Step S4). The information processing device 100 specifies the motion type of the user U1 on the basis of a motion of the head HD that is the main part M1 between the state ST1 and the state ST2. In the example of FIG. 1, since the user U1 makes a motion of tilting (rotating) the head between the state ST1 and the state ST2, the information processing device 100 specifies the motion type as "ROTATE".

Then, the information processing device 100 specifies a part to be a target of correction processing of the motion information corresponding to the body motion (hereinafter, also referred to as "related part") (Step S5). The information processing device 100 specifies the related part on the basis of the head HD that is the main part M1 between the state ST1 and the state ST2 and the motion type "ROTATE". For example, the information processing device 100 specifies the related part by using definition information indicating association between the main part and the related part. For example, the information processing device 100 specifies the related part by using data definition information (main part/related part information) of a part that may make a motion along with each body part. For example, the information processing device 100 specifies the related part by using definition information stored in a part information storage unit 123 (see FIG. 5). In such a manner, the information processing device 100 acquires corresponding related part data, and specifies the related part by using the acquired information.

In the example of FIG. 1, the information processing device 100 specifies the related part by using, among pieces of the definition information, association information INF1 in which a combination of the main part "HEAD" indicating the head and the motion type "ROTATE" and the related part are associated with each other. As a result, the information processing device 100 specifies a right wrist RW and a left wrist LW of the user U1 as related parts corresponding to the motion of rotating the head by the user U1.

The information processing device 100 specifies, as the related parts, the right wrist RW and the left wrist LW of the user U1 among five body parts that are a body BD, the right wrist RW, the left wrist LW, a right leg RL, and a left leg LL of the user U1 which parts are other than the head HD that is the main part M1. Note that the body parts of the user may be divided in more detail although only six parts are illustrated as the body parts in FIG. 1 in order to simplify the description. As described above, in the example of FIG. 1, the information processing device 100 specifies the right wrist RW as a related part R1, and specifies the left wrist LW as a related part R2.

Then, the information processing device 100 performs processing of correcting the motion (Step S6). The information processing device 100 performs a correction of cancelling the motion of the related part. In the example of FIG. 1, the information processing device 100 performs correction of cancelling the motion of the right wrist RW that is the related part R1. That is, the information processing device 100 performs the correction of returning a position of the right wrist RW in the state ST2 to a position of the right wrist RW in the state ST1. As a result, the information processing device 100 corrects the state ST2 before the correction to a state in which the position of the right wrist RW is returned to the position of the state ST1 and only the head HD is tilted as in a state ST3 after the correction. Note that since there is no change in the position between the state ST1 and the state ST2 with respect to the left wrist LW that is the related part R2, correction is not performed for the left wrist LW. However, in a case where there is a change in the position of the left wrist LW, the motion of the left wrist LW may also be canceled. Then, by using motion information corresponding to the state ST3, the information processing device 100 estimates intent of an input by the body motion of the user. For example, the information processing device 100 specifies the intent of the input by the body motion of the user by inputting the motion information corresponding to the state ST3 to a detector or the like.

In such a manner, the information processing device 100 specifies the main part corresponding to the body motion of the user on the basis of the outline information, and specifies the related part on the basis of the specified main part and motion type. As a result, the information processing device 100 can specify the main part that is the part corresponding to the input intent of the user, and the related part where the motion is generated along with the motion of the main part. Thus, the information processing device 100 can appropriately specify the part related to the body motion of the user. Here, when a person tilts his/her head (head tilting), movement of a wrist on an opposite side of a tilting direction is generated unconsciously. In a case where there is a function with respect to such a motion of the wrist exists, erroneous activation thereof may be caused. Thus, by specifying the wrist of the user as the related part and correcting the motion of the wrist in a case where the user tilts the head, the information processing device 100 can control the erroneous activation of a case where there is the function with respect to the motion of the wrist.

Then, by canceling the motion with predefined data, the information processing device 100 can control an influence of the body motion of the user which motion is generated depending on a skeleton or the like of the user. The information processing device 100 can more accurately recognize the input by the body motion of the user by using the motion information in which the motion of the part other than the head HD that is the main part M1 is canceled as in the state ST3 after the correction. Note that the information processing device 100 is not limited to the case of canceling the motion of the related part, and may perform correction of reducing the motion of the related part. Furthermore, the information processing device 100 may perform correction of emphasizing the motion of the related part. This point will be described later in detail.

1-1-1. Background and Effects

Conventionally, an interface using a body motion of a user limitedly uses a gesture command or the like. However, in recent years, it becomes possible to sense detailed body motions, and interaction to which these pieces of motion information are applied is expanded.

Then, as described above, even in a case where the user intentionally moves a specific body part, there is a case where a part other than the intentionally-moved part unconsciously moves due to physical characteristics or the like. Such an "unconscious motion" of the user causes false recognition on a system side.

On the other hand, the information processing device 100 leaves only actual motion intent of the user by specifying a body part that is unconsciously moving from the motion of the user and canceling the motion. As a result, the information processing device 100 can appropriately specify the part related to the body motion of the user.

1-1-2. Application Example

The information processing device 100 may be applied to various kinds of services, processing, and the like. An example of this point will be described in the following. Note that the application described in the following is merely an example, and may be applied to any service or processing as long as the application is possible.

The information processing device 100 is not limited to the case described with reference to FIG. 1, and may be applied to instant equipment control using a body motion. For example, the information processing device 100 may be applied to a service provided by a TV, a smart speaker, a smartphone, or the like. For example, the information processing device 100 may be applied to a service using a smart speaker with a camera.

Furthermore, the information processing device 100 may be applied to a service that posts a moving image or distributes a moving image by using computer graphics or a (virtual) character (avatar). In this case, it is possible to express a characteristic of the character by using a motion of only an intended body part or changing a correction method according to character (attribute) of the avatar instead of using the motion data as it is, for example. For example, it is possible to express the characteristic of the character by changing the correction method of the character (attribute) such as a gender or age of the avatar. Note that this point will be described later in detail in and after FIG. 10.

Furthermore, the information processing device 100 may be applied to practice or image creation of sport or the like. In this case, application to promotion of the practice or image creation may be performed by visualization of an ideal state of motion of the user by utilization of control information acquired, for example, from a motion of a user such as a professional (player) of sport or the like or an expert of a certain technology (also referred to as "model user"). The information processing device 100 may use, as the control information, information generated from motion information of the model user. For example, the information processing device 100 may use, as the control information, definition information in which a main part and a related part based on the motion of the model user are associated. For example, the information processing device 100 may correct a motion of a user other than the model user (also referred to as "normal user") on the basis of the control information. As a result, the information processing device 100 can correct the motion of the normal user to an appropriate motion on the basis of the motion of the model user. Furthermore, the information processing device 100 may provide the normal user with information indicating the motion of the normal user which motion is corrected on the basis of the motion of the model user (also referred to as "corrected motion information"). The information processing device 100 may transmit the corrected motion information to the terminal device 10 used by the normal user. The terminal device 10 displays the corrected motion information and causes the normal user to recognize the appropriate motion. As a result, the information processing system 1 can cause the normal user to grasp the motion reflecting the motion of the model user, and can promote improvement in a skill, technique, and the like of the normal user.

1-2. Configuration of an Information Processing System According to the First Embodiment The information processing system 1 illustrated in FIG. 2 will be described. As illustrated in FIG. 2, the information processing system 1 includes the terminal device 10 and the information processing device 100. The terminal device 10 and the information processing device 100 are communicably connected in a wired or wireless manner via a predetermined communication network (network N). FIG. 2 is a view illustrating a configuration example of the information processing system according to the first embodiment. Note that the information processing system 1 illustrated in FIG. 2 may include a plurality of terminal devices 10 and a plurality of information processing devices 100.

The information processing device 100 is a computer that specifies, on the basis of outline information indicating an outline of a user who makes a body motion, a main part corresponding to the body motion and a related part to be a target of correction processing of motion information corresponding to the body motion among body parts. Furthermore, the information processing device 100 is a computer that transmits various kinds of information to the terminal device 10. The information processing device 100 is a server device used to provide services related to various functions.

Furthermore, the information processing device 100 may include software modules of speech signal processing, speech recognition, speech semantic analysis, interaction control, and the like. The information processing device 100 may have a function of speech recognition. For example, the information processing device 100 may have functions of natural language understanding (NLU) and automatic speech recognition (ASR). For example, the information processing device 100 may estimate information related to intent (intent) and an entity (target) of the user from input information according to speech of the user.

Furthermore, the information processing device 100 may be able to acquire information from a speech recognition server that provides a speech recognition service. In this case, the information processing system 1 may include the speech recognition server. For example, by appropriately using various related arts, the information processing device 100 or the speech recognition server recognizes the speech of the user or specifies the user who speaks.

The terminal device 10 is a terminal device that detects, by a sensor the outline information indicating the outline of the user who makes the body motion. For example, the terminal device 10 detects, by the image sensor 171, image information indicating the outline of the user who makes the body motion. The terminal device 10 is an information processing device that transmits the outline information of the user to the server device such as the information processing device 100.

The terminal device 10 is device equipment used by the user. The terminal device 10 receives an input by the user. The terminal device 10 receives a voice input by the speech of the user or an input by operation by the user. The terminal device 10 displays information corresponding to the input by the user. The terminal device 10 may be any device as long as the processing in the first embodiment can be realized. The terminal device 10 may be any device as long as a function of detecting the outline information of the user and performing transmission thereof to the information processing device 100 is included. For example, the terminal device 10 may be a television, smartphone, tablet terminal, notebook personal computer (PC), desktop PC, cellular phone, personal digital assistant (PDA), or the like.

Figure 3:
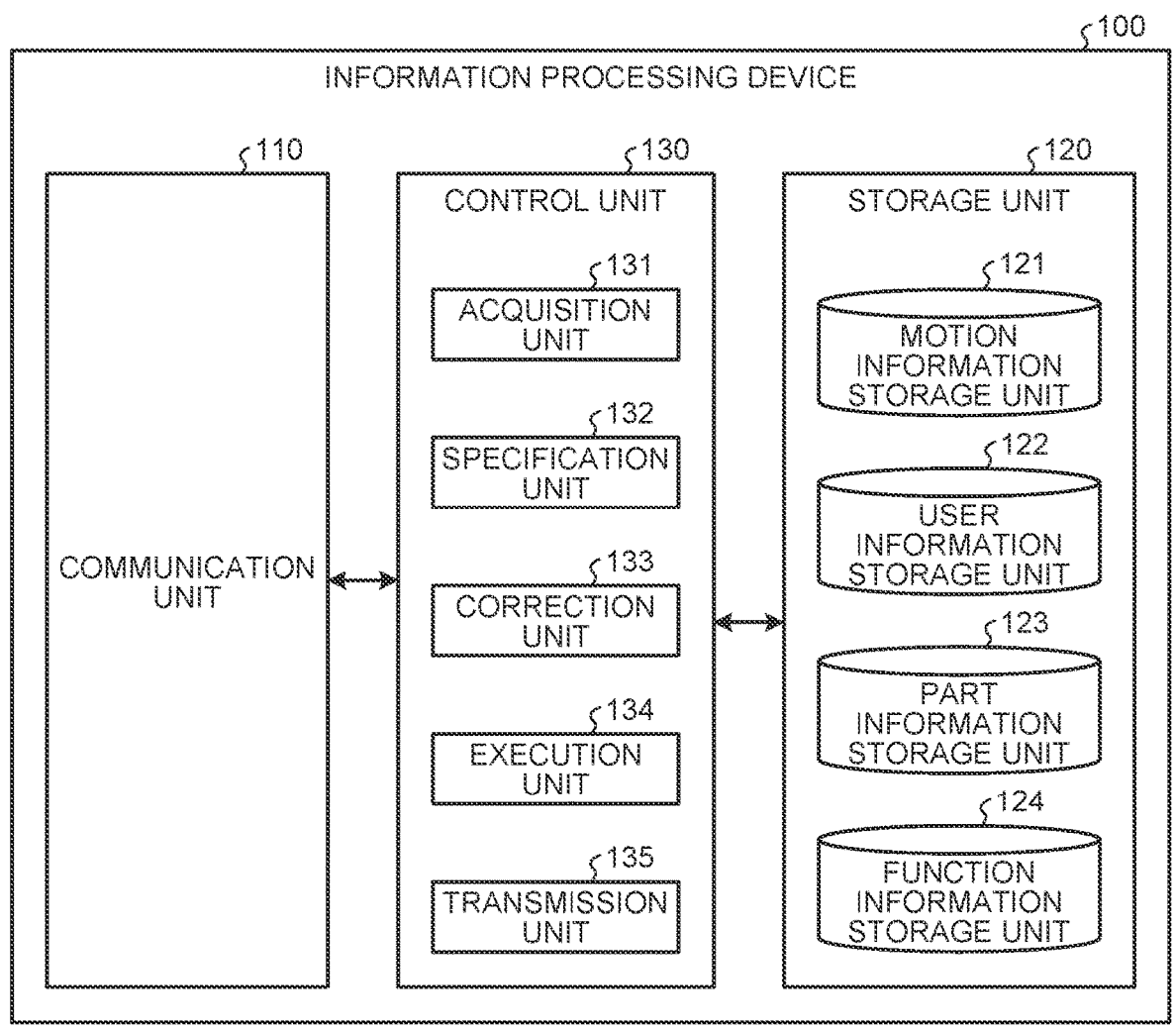
FIG. 3 is a view illustrating a configuration example of an information processing device according to the first embodiment of the present disclosure.

1-3. Configuration of an Information Processing Device According to the First Embodiment Next, a configuration of the information processing device 100 that is an example of the information processing device that executes the information processing according to the first embodiment will be described. FIG. 3 is a view illustrating a configuration example of the information processing device 100 according to the first embodiment of the present disclosure.

As illustrated in FIG. 3, the information processing device 100 includes a communication unit 110, a storage unit 120, and a control unit 130. Note that the information processing device 100 includes an input unit (such as keyboard or mouse) that receives various kinds of operation from an administrator or the like of the information processing device 100, and a display unit (such as liquid-crystal display) to display various kinds of information.

The communication unit 110 is realized, for example, by a network interface card (NIC) or the like. Then, the communication unit 110 is connected to the network N (see FIG. 2) in a wired or wireless manner, and transmits/receives information to/from another information processing device such as the terminal device 10 or the speech recognition server. Furthermore, the communication unit 110 may transmit/receive information to/from a user terminal (not illustrated) used by the user.

The storage unit 120 is realized by a semiconductor memory element such as a random access memory (RAM) or a flash memory, or a storage device such as a hard disk or an optical disk, for example. As illustrated in FIG. 3, the storage unit 120 according to the first embodiment includes a motion information storage unit 121, a user information storage unit 122, a part information storage unit 123, and a function information storage unit 124.

Figure 4:
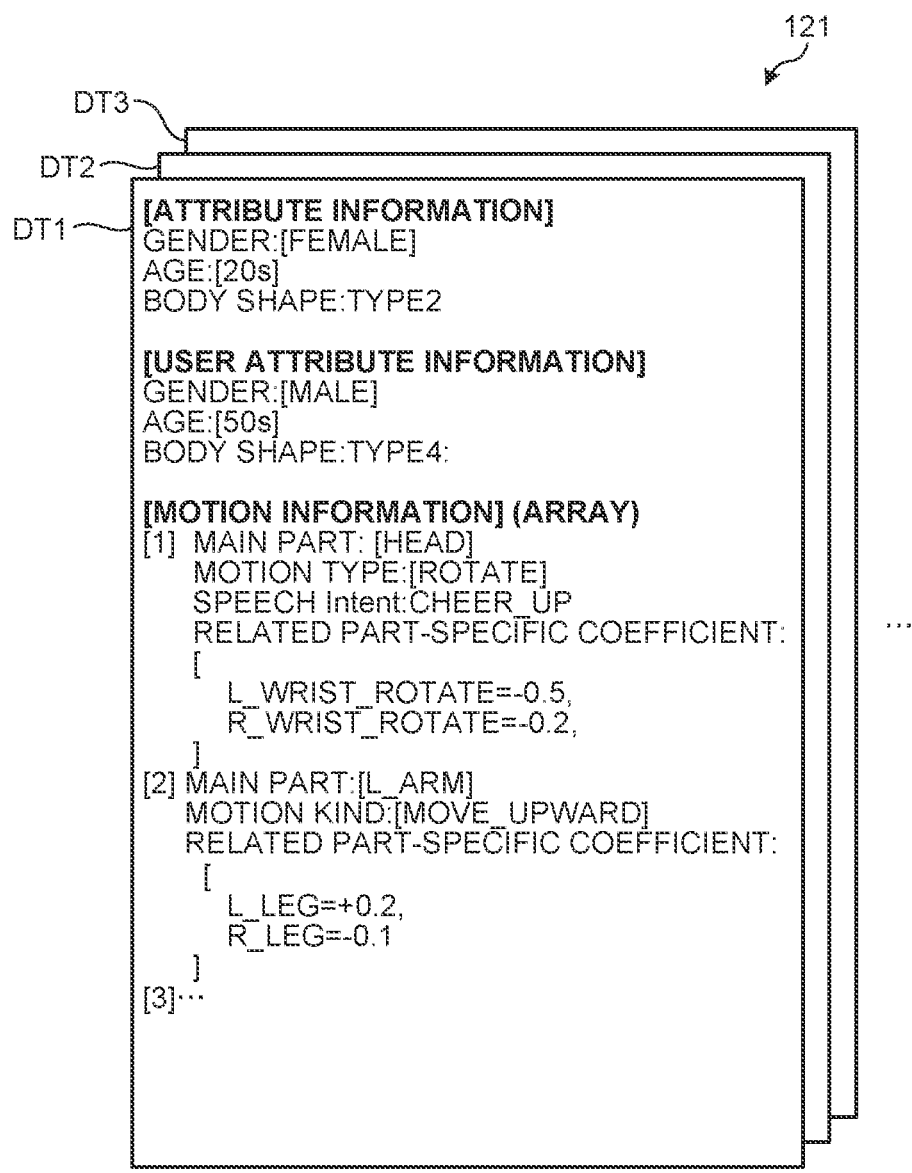
FIG. 4 is a view illustrating an example of a motion information storage unit according to the first embodiment of the present disclosure.

The motion information storage unit 121 according to the first embodiment stores various kinds of information related to the body motion of the user. The motion information storage unit 121 stores various kinds of information such as attribute information of the user and motion information corresponding to the body motion of the user. Data indicated by data DT1 indicates a structure of the motion data (motion information). Although only pieces of data DT1 to DT3 are illustrated in the example of FIG. 4, the pieces of data DT1 to DT3 are not limitations and many pieces of data are included. Note that as indicated in "attribute information", a case where attribute information of a virtual character (hereinafter, also referred to as "avatar") to be moved by the user is included is illustrated as an example in the example of FIG. 4. However, in a case where the body motion of the user is simply used as an input, the attribute information of the virtual character may not be included. Note that in a case of being used as a motion of the virtual character, the body motion of the user is included in the attribute information of the virtual character in the motion information storage unit 121. This point will be described later.

The "user attribute information" illustrated in FIG. 4 indicates attribute information of the user to which information this motion data is adapted. The "user attribute information" in the data DT1 in FIG. 4 indicates attribute information of a user who is a man in his fifties and has a body shape of "TYPE4". For example, the information of the "user attribute information" in the data DT1 in FIG. 4 corresponds to the attribute information of the user U1 illustrated in FIG. 1. The data DT1 indicates data (motion information) generated by a body motion of the user who is the man in his fifties and has the body shape of "TYPE4".

The "motion information" illustrated in FIG. 4 includes an array of motion kinds and coefficients for correction by main part. Speech Intent in the "motion information" is used in a case where a main part or the like is specified from speech. Each of the coefficients may act on a motion amount of each part of the user as a constant, or a value considering each of the coefficients in proportion to the motion amount of the main part may be used.

Furthermore, for example, a coefficient is set between "−1" and "1". For example, in a case where the coefficient is "0", it is indicated that the motion is not corrected. Furthermore, for example, in a case where the coefficient is smaller than "0", it is indicated that correction of reducing the motion is performed. For example, in a case where the coefficient is "−1", it is indicated that the motion is canceled.

For example, in a case where the coefficient is larger than "0", it is indicated that correction of emphasizing the motion is performed.

The "motion information" in the data DT1 in FIG. 4 includes a group of pieces of motion information. For example, the "motion information" in the data DT1 in FIG. 4 includes a group of pieces of motion information arranged in time series. For example, the first motion information among the pieces of "motion information" in the data DT1 in FIG. 4 indicates that, in a case where the motion of rotating the head that is the main part among the body parts of the user is performed, the related parts thereof are the left wrist and the right wrist. Furthermore, related part-specific coefficients indicate that the rotation of the left wrist is "−0.5" and the rotation of the right wrist is "−0.2". In this case, it is indicated that the rotation of the left wrist is corrected by "−0.5" and the rotation of the right wrist is corrected by "−0.2" with respect to the motion information corresponding to the body part of the user.

Furthermore, the speech intent is "CHEER_UP" and it is indicated that a corresponding motion is intended to cheer up. Note that the motion information may not include the speech intent. Furthermore, in the example of FIG. 4, a case where the group of pieces of motion information is stored in the form of the array is illustrated. However, the array is not a limitation, and any form is possible as long as context of pieces of motion information can be specified.

Note that the motion information storage unit 121 may store not only the above but also various kinds of information depending on a purpose.

The user information storage unit 122 according to the first embodiment stores various kinds of information related to the user. For example, the user information storage unit 122 stores the various kinds of information such as attribute information of each user.

The user information storage unit 122 stores the information related to the user, such as a user ID, age, gender, and place of residence. For example, the user information storage unit 122 stores information related to the user U1, such as an age, gender, and place of residence of the user U1 in association with a user ID "U1" for identifying the user U1.

Furthermore, the user information storage unit 122 stores information for identifying a device (such as television or smartphone) used by each user in association with the user. The user information storage unit 122 stores information for identifying the terminal device 10 used by each user (such as terminal ID) in association with the user.

Note that the user information storage unit 122 may store not only the above but also various kinds of information depending on a purpose. For example, the user information storage unit 122 may store not only the age and gender but also other demographic attribute information and psychographic attribute information. For example, the user information storage unit 122 may store information such as a name, home, place of work, interest, family structure, income, and lifestyle.

The part information storage unit 123 according to the first embodiment stores various kinds of information related to the body parts. For example, the part information storage unit 123 stores, as the definition information, information in which a corresponding related part is associated to each combination of a main part and a motion type. FIG. 5 is a view illustrating an example of the part information storage unit according to the first embodiment of the present disclosure.

The part information storage unit 123 illustrated in FIG. 5 includes items such as a "main part", "motion type", and "related part". Furthermore, in the example of FIG. 5, a case where items such as "#1" and "#2" are included in the "main part" and items such as "#1", "#2", "#3", and "#4" are included in the "related part" is illustrated. Note that the "main part" is not limited to "#1" and "#2", and may include as many items as main parts and include "#3" and "#4", for example. Also, the "related part" is not limited to "#1", "#2", "#3", and "#4" and may include as many items as related parts and include "#5" and "#6", for example.

The "main part" indicates a main part corresponding to the body motion of the user. For example, the "main part" indicates a body motion of the user which motion is a main motion in a motion of a corresponding motion type. The "main part" indicates a part where an amount of change in a position due to the body motion of the user is large. For example, the "main part" indicates a part where the amount of change in the position due to the body motion of the user is the largest. Note that identification information for identifying each part (such as part ID) may be stored in the "main part".

The "motion type" indicates a motion type. The "motion type" indicates a name of the motion type. Note that identification information for identifying each motion type (such as motion type ID) may be stored in the "motion type".

The "related part" indicates a part corresponding to a combination of a corresponding main part and motion type. The "related part" indicates a part that moves along with the motion of the main part during the motion of the corresponding motion type. The "related part" indicates a part to be a target of correction processing of the motion information corresponding to the body motion. Note that identification information for identifying each part (such as part ID) may be stored in the "related part".

In the example of FIG. 5, it is indicated that two parts "L_WRIST" and "R_WRIST" are related parts corresponding to a combination of the main part "HEAD" and the motion type "ROTATE". That is, it is indicated that, in a case where the motion of rotating the head that is the main part among the body parts of the user is made, the related parts thereof are the left wrist and the right wrist.

In addition, it is indicated that four parts "L_WRIST", "R_WRIST", "L_LEG", and "R_LEG" are related parts corresponding to a combination of the main part "HEAD" and the motion type "MOVE". That is, it is indicated that, in a case where the motion of rotating the head that is the main part among the body parts of the user is made, the related parts thereof are the left wrist, right wrist, left leg, and right leg.

Note that the part information storage unit 123 may store not only the above but also various kinds of information depending on a purpose. The part information storage unit 123 may store, in association with each related part, information indicating a correction amount of a case where the motion of the related part is corrected (correction amount information). For example, the part information storage unit 123 may store, in association with each related part, the correction amount information indicating how much emphasis is to be applied in a case where the motion of the related part is emphasized.

The function information storage unit 124 according to the first embodiment stores various kinds of information related to a function. The function information storage unit 124 stores information related to each function executed in response to the input by the user. The function information storage unit 124 stores information related to the input necessary for execution of the function. The function information storage unit 124 stores an input item necessary for execution of each function. Note that the function information storage unit 124 may store not only the above but also various kinds of information depending on a purpose.

Returning to FIG. 3, the description is continued. The control unit 130 is realized, for example, when a program (such as information processing program according to the present disclosure) stored in the information processing device 100 is executed by a central processing unit (CPU), a micro processing unit (MPU), or the like with a random access memory (RAM) or the like as a work area. Also, the control unit 130 is realized by, for example, an integrated circuit such as an application specific integrated circuit (ASIC) or a field programmable gate array (FPGA).

As illustrated in FIG. 3, the control unit 130 includes an acquisition unit 131, a specification unit 132, a correction unit 133, an execution unit 134, and a transmission unit 135, and realizes or executes a function and an action of information processing described below. Note that an internal configuration of the control unit 130 is not limited to the configuration illustrated in FIG. 3, and may be another configuration as long as being a configuration of performing information processing described later. Also, a connection relationship of each processing unit included in the control unit 130 is not limited to the connection relationship illustrated in FIG. 3, and may be another connection relationship.

The acquisition unit 131 acquires various kinds of information. The acquisition unit 131 acquires the various kinds of information from an external information processing device. The acquisition unit 131 acquires the various kinds of information from the terminal device 10. The acquisition unit 131 acquires, from the terminal device 10, the various kinds of information detected by a sensor unit 17 of the terminal device 10. The acquisition unit 131 acquires, from the terminal device 10, the various kinds of information detected by the image sensor 171 of the sensor unit 17. The acquisition unit 131 acquires the various kinds of information from other information processing devices such as a speech recognition server.

The acquisition unit 131 acquires the various kinds of information from the storage unit 120. The acquisition unit 131 acquires the various kinds of information from the motion information storage unit 121, the user information storage unit 122, the part information storage unit 123, and the function information storage unit 124. The acquisition unit 131 acquires the various kinds of information specified by the specification unit 132. The acquisition unit 131 acquires the various kinds of information corrected by the correction unit 133.

The acquisition unit 131 acquires outline information indicating an outline of the user who makes the body motion. The acquisition unit 131 acquires the outline information detected by the sensor. The acquisition unit 131 acquires the outline information that is image information detected by the image sensor. The acquisition unit 131 acquires speech information of the user. The acquisition unit 131 acquires outline information of the user who performs the input by the body motion. The acquisition unit 131 acquires definition information indicating association between the main part and the related part.

The acquisition unit 131 acquires, as the outline information, moving image information including a plurality of frames. The acquisition unit 131 acquires the outline information indicating the body motion of the user U1. The acquisition unit 131 acquires, as the outline information, a plurality of pieces of image information such as image information corresponding to a state ST1 and image information corresponding to the state ST2.

The specification unit 132 specifies various kinds of information. The specification unit 132 determines the various kinds of information. The specification unit 132 makes various kinds of determination. The specification unit 132 judges the various kinds of information. For example, the specification unit 132 specifies various kinds of information on the basis of the information from the external information processing device or the information stored in the storage unit 120. The specification unit 132 specifies the various kinds of information on the basis of the information from the other information processing devices such as the terminal device 10 and the speech recognition server. The specification unit 132 specifies the various kinds of information on the basis of the information stored in the motion information storage unit 121, the user information storage unit 122, the part information storage unit 123, or the function information storage unit 124. The specification unit 132 extracts the various kinds of information. For example, the specification unit 132 extracts the various kinds of information on the basis of the information from the external information processing device or the information stored in the storage unit 120.

The specification unit 132 specifies the various kinds of information on the basis of the various kinds of information acquired by the acquisition unit 131. The specification unit 132 specifies the various kinds of information on the basis of the various kinds of information corrected by the correction unit 133. The specification unit 132 makes various kinds of determination on the basis of the specification. The various kinds of determination are made on the basis of the information acquired by the acquisition unit 131.

On the basis of the outline information acquired by the acquisition unit 131, the specification unit 132 specifies, among the body parts, a main part corresponding to a body motion and a related part to be a target of correction processing of motion information corresponding to the body motion. The specification unit 132 specifies a related part to be a target of cancelation of an influence of the body motion. The specification unit 132 specifies a related part to be a target of emphasis on the influence of the body motion.

The specification unit 132 specifies the main part on the basis of a conversion amount of a position of each of the body parts of the user. The specification unit 132 specifies, as the main part, a part having a large conversion amount of the position among the body parts. The specification unit 132 specifies the main part on the basis of speech information of the user. The specification unit 132 specifies the related part on the basis of the speech information of the user. The specification unit 132 specifies the main part on the basis of the speech intent of the user which intent is estimated from speech contents of the user. The specification unit 132 specifies, as the related part, a moving part among parts other than the main part corresponding to the speech intent of the user.

The specification unit 132 specifies the related part on the basis of the definition information. The specification unit 132 specifies the main part corresponding to an input by the user. The specification unit 132 specifies, as the related part, a part that moves along with the motion of the main part.

The specification unit 132 specifies a function execution of which is instructed by the user. The specification unit 132 specifies the function corresponding to the motion information of the user. The specification unit 132 specifies the function on the basis of the motion information of the user. The specification unit 132 specifies the function on the basis of the motion information corrected by the correction unit 133.

For example, the specification unit 132 estimates the intent of the speech of the user by the function of natural language understanding. The specification unit 132 estimates the intent of the speech of the user by using the technology of natural language understanding or entity analysis.

The specification unit 132 specifies, as the main part, a part having a large amount of change in the body motion of the user U1 between the state ST1 and state ST2. The specification unit 132 specifies, as the main part M1, the head HD that is the part having the large amount of change between the state ST1 and the state ST2 among the body parts of the user U1. The specification unit 132 specifies the motion type of the user U1 on the basis of a motion of the head HD that is the main part M1 between the state ST1 and the state ST2. Since the user U1 makes a motion of tilting (rotating) the head between the state ST1 and the state ST2, the specification unit 132 specifies the motion type as "ROTATE".

The specification unit 132 specifies the related part on the basis of the head HD that is the main part M1 between the state ST1 and the state ST2 and the motion type "ROTATE". The specification unit 132 specifies the right wrist RW and the left wrist LW of the user U1 as related parts corresponding to the motion of rotating the head by the user U1. The specification unit 132 specifies the right wrist RW as the related part R1 and specifies the left wrist LW as the related part R2.

The correction unit 133 corrects various kinds of information. The correction unit 133 corrects the various kinds of information on the basis of the information from the external information processing device or the information stored in the storage unit 120. The correction unit 133 corrects the various kinds of information on the basis of the information from the other information processing devices such as the terminal device 10 and the speech recognition server. The correction unit 133 corrects the various kinds of information on the basis of the information stored in the motion information storage unit 121, the user information storage unit 122, the part information storage unit 123, or the function information storage unit 124.

The correction unit 133 corrects the various kinds of information on the basis of the various kinds of information acquired by the acquisition unit 131. The correction unit 133 corrects the various kinds of information on the basis of the various kinds of information specified by the specification unit 132. The correction unit 133 corrects the various kinds of information on the basis of processing executed by the execution unit 134.

The correction unit 133 corrects motion information corresponding to the related parts specified by the specification unit 132. The correction unit 133 corrects motion information corresponding to the main part specified by the specification unit 132.

The correction unit 133 performs correction of cancelling the motion of the right wrist RW that is the related part R1. The correction unit 133 performs correction of returning the position of the right wrist RW in the state ST2 to the position of the right wrist RW in the state ST1. The correction unit 133 corrects the state ST2 before the correction to a state in which the position of the right wrist RW is returned to the position of the state ST1 and only the head HD is tilted as in the state ST3 after the correction.

The execution unit 134 executes various kinds of processing. The execution unit 134 determines to execute the various kinds of processing. The execution unit 134 executes the various kinds of processing on the basis of the information from the external information processing device. The execution unit 134 executes the various kinds of processing on the basis of the information stored in the storage unit 120. The execution unit 134 executes the various kinds of processing on the basis of the information stored in the motion information storage unit 121, the user information storage unit 122, the part information storage unit 123, or the function information storage unit 124.

The execution unit 134 executes the various kinds of processing on the basis of the various kinds of information acquired by the acquisition unit 131. The execution unit 134 executes the various kinds of processing on the basis of the various kinds of information specified by the specification unit 132. The execution unit 134 executes the various kinds of processing on the basis of the various kinds of information corrected by the correction unit 133.

The execution unit 134 generates various kinds of information. The execution unit 134 generates the various kinds of information on the basis of the information from the external information processing device or the information stored in the storage unit 120. The execution unit 134 generates the various kinds of information on the basis of the information from the other information processing devices such as the terminal device 10 and the speech recognition server. The execution unit 134 generates the various kinds of information on the basis of the information stored in the motion information storage unit 121, the user information storage unit 122, the part information storage unit 123, or the function information storage unit 124.

The execution unit 134 generates motion information from image information acquired by imaging of the user. The execution unit 134 generates the motion information from a plurality of pieces of image information acquired by imaging of the user. The execution unit 134 generates the motion information corresponding to the user on the basis of a difference between the plurality of pieces of image information acquired by imaging of the user. The execution unit 134 generates the motion information corresponding to the body motion of the user between the state ST1 and the state ST2.

The transmission unit 135 transmits various kinds of information. The transmission unit 135 transmits the various kinds of information to the external information processing device. The transmission unit 135 provides the various kinds of information to the external information processing device. For example, the transmission unit 135 transmits the various kinds of information to the other information processing devices such as the terminal device 10 and the speech recognition server. The transmission unit 135 provides the information stored in the storage unit 120. The transmission unit 135 transmits the information stored in the storage unit 120.

The transmission unit 135 provides the various kinds of information on the basis of the information from the other information processing devices such as the terminal device 10 and the speech recognition server. The transmission unit 135 provides the various kinds of information on the basis of the information stored in the storage unit 120. The transmission unit 135 provides the various kinds of information on the basis of the information stored in the motion information storage unit 121, the user information storage unit 122, the part information storage unit 123, or the function information storage unit 124.

The transmission unit 135 transmits, to the terminal device 10, information indicating a function to be executed by the terminal device 10. The transmission unit 135 transmits, to the terminal device 10, information indicating the function determined to be executed by the execution unit 134.

1-4. Configuration of a Terminal Device According to the First Embodiment

Figure 6:
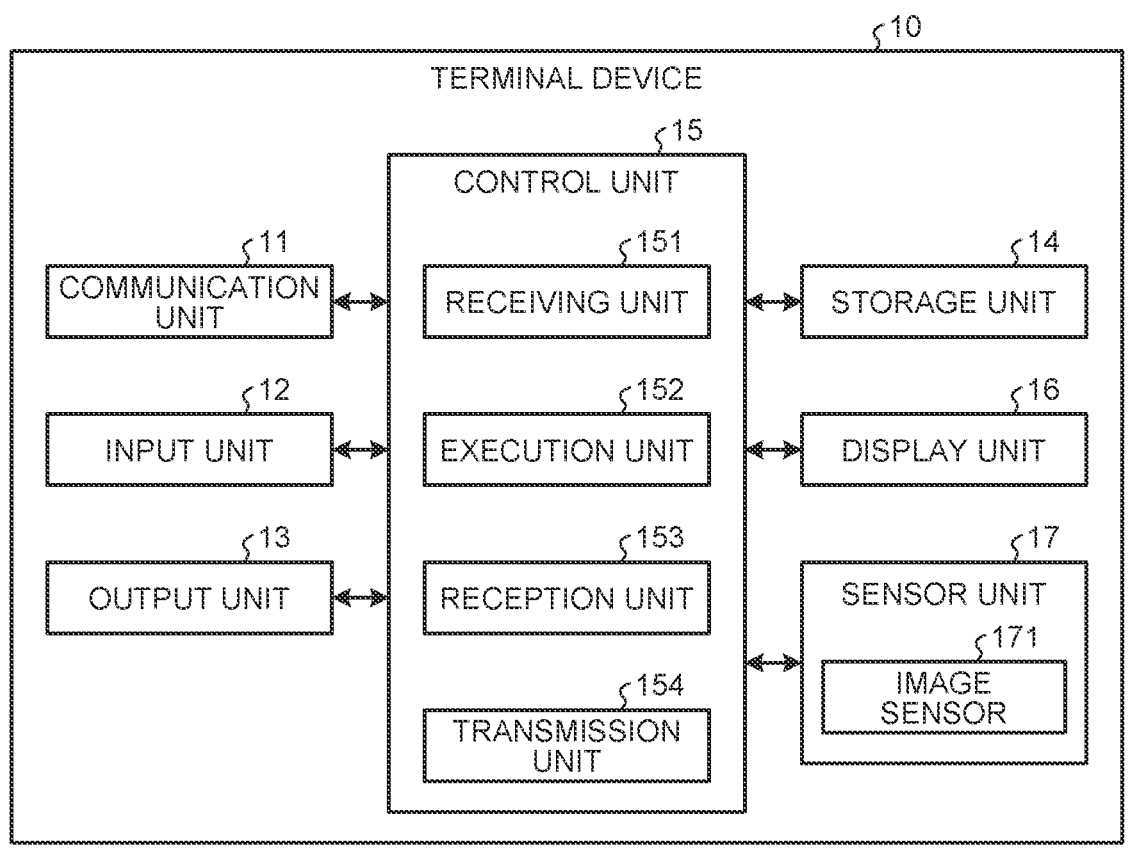
FIG. 6 is a view illustrating a configuration example of a terminal device according to the first embodiment of the present disclosure.

Next, a configuration of the terminal device 10, which is an example of the information processing device that executes the information processing according to the first embodiment, will be described. FIG. 6 is a view illustrating a configuration example of the terminal device according to the first embodiment of the present disclosure.

As illustrated in FIG. 6, the terminal device 10 includes a communication unit 11, an input unit 12, an output unit 13, a storage unit 14, a control unit 15, a display unit 16, and a sensor unit 17.

The communication unit 11 is realized, for example, by a NIC, a communication circuit, or the like. The communication unit 11 is connected to the network N (such as the Internet) in a wired or wireless manner, and transmits/receives information to/from other devices such as the information processing device 100 via the network N.

The input unit 12 receives various kinds of input. The input unit 12 receives detection by the sensor unit 17 as an input. The input unit 12 receives an input of the outline information indicating the outline of the user who makes the body motion. The input unit 12 receives the input of the outline information detected by the sensor unit 17. The input unit 12 receives the input of the outline information that is the image information detected by the image sensor 171. The input unit 12 receives an input of the speech information of the user. The input unit 12 receives the input of the outline information of the user who performs the input by the body motion. The input unit 12 receives a gesture or a gaze of the user as the input.

Various kinds of operation are input from the user to the input unit 12. The input unit 12 receives sound as the input by the sensor unit 17 having a function of detecting speech. The input unit 12 receives, as input information, speech information detected by a microphone (sound sensor) that detects speech. The input unit 12 receives a voice by the speech of the user as the input information.

Furthermore, the input unit 12 may receive, as an operation input by the user, operation (user operation) on the terminal device 10 used by the user. The input unit 12 may receive, via the communication unit 11, information related to operation by the user using a remote controller (remote controller). Furthermore, the input unit 12 may include a button provided on the terminal device 10, or a keyboard or a mouse connected to the terminal device 10.

For example, the input unit 12 may have a touch panel capable of realizing functions equivalent to those of a remote controller, a keyboard, and a mouse. In this case, various kinds of information are input to the input unit 12 via the display unit 16. The input unit 12 receives various kinds of operation from the user via a display screen by the function of the touch panel realized by various sensors. That is, the input unit 12 receives various kinds of operation from the user via the display unit 16 of the terminal device 10. For example, the input unit 12 receives operation such as designation operation by the user via the display unit 16 of the terminal device 10. For example, the input unit 12 functions as a reception unit that receives the operation by the user by the function of the touch panel. In this case, the input unit 12 and a reception unit 153 may be integrated. Note that a capacitive sensing method is mainly employed in the tablet terminal as a detection method for the operation of the user by the input unit 12. However, any method such as a resistive film method, a surface acoustic wave method, an infrared method, and an electromagnetic induction method that are other detection methods may be employed as long as the operation of the user can be detected and the function of the touch panel can be realized.

For example, the input unit 12 receives the speech of the user U1 as an input. The input unit 12 receives, as the input, the speech of the user U1 which speech is detected by the sensor unit 17. The input unit 12 receives, as the input, the speech of the user U1 which speech is detected by the sound sensor of the sensor unit 17.

The output unit 13 outputs various kinds of information. The output unit 13 has a function of outputting sound. For example, the output unit 13 includes a speaker that outputs sound. The output unit 13 outputs information by sound to the user. The output unit 13 outputs the information displayed on the display unit 16 by sound.

The storage unit 14 is realized, for example, by a semiconductor memory element such as a RAM or a flash memory, or a storage device such as a hard disk or an optical disk. The storage unit 14 stores various kinds of information used for displaying information.

Returning to FIG. 6, the description is continued. The control unit 15 is realized, for example, when a program (such as display program of the information processing program according to the present disclosure, or the like) stored in the terminal device 10 is executed by a CPU, MPU, or the like with a RAM or the like as a work area. Also, the control unit 15 may be realized by, for example, an integrated circuit such as an ASIC or an FPGA.

As illustrated in FIG. 6, the control unit 15 includes a receiving unit 151, an execution unit 152, a reception unit 153, and a transmission unit 154, and realizes or executes a function and an action of information processing described below. Note that an internal configuration of the control unit 15 is not limited to the configuration illustrated in FIG. 6, and may be another configuration as long as being a configuration of performing information processing described later.

The receiving unit 151 receives various kinds of information. The receiving unit 151 receives the various kinds of information from the external information processing device. The receiving unit 151 receives the various kinds of information from other information processing devices such as the information processing device 100 and the speech recognition server.

The receiving unit 151 receives an instruction to execute various functions from the information processing device 100. For example, the receiving unit 151 receives information of designating a function from the information processing device 100 as the instruction to execute the function. The receiving unit 151 receives content. The receiving unit 151 receives the content to be displayed from the information processing device 100.

The execution unit 152 executes various kinds of processing. The execution unit 152 determines to execute the various kinds of processing. The execution unit 152 executes the various kinds of processing on the basis of the information from the external information processing device. The execution unit 152 executes the various kinds of processing on the basis of the information from the information processing device 100. The execution unit 152 executes the various kinds of processing according to the instruction from the information processing device 100. The execution unit 152 executes the various kinds of processing on the basis of the information stored in the storage unit 14.

The execution unit 152 controls various kinds of display. The execution unit 152 controls the display on the display unit 16. The execution unit 152 controls the display on the display unit 16 in response to the reception by the receiving unit 151. The execution unit 152 controls the display on the display unit 16 on the basis of information received by the receiving unit 151. The execution unit 152 controls the display on the display unit 16 on the basis of information received by the reception unit 153. The execution unit 152 controls the display on the display unit 16 in response to the reception by the reception unit 153.

The reception unit 153 receives various kinds of information. The reception unit 153 receives an input by the user via the input unit 12. The reception unit 153 receives speech of the user as the input. The reception unit 153 receives operation by the user. The reception unit 153 receives the operation by the user on the information displayed by the display unit 16. The reception unit 153 receives a character input by the user.

The transmission unit 154 transmits various kinds of information to the external information processing device. For example, the transmission unit 154 transmits the various kinds of information to the other information processing device such as the terminal device 10 and the speech recognition server. The transmission unit 154 transmits the information stored in the storage unit 14.

The transmission unit 154 transmits the various kinds of information on the basis of the information from the other information processing devices such as the information processing device 100 and the speech recognition server. The transmission unit 154 transmits the various kinds of information on the basis of the information stored in the storage unit 14.

The transmission unit 154 transmits the sensor information detected by the sensor unit 17 to the information processing device 100. The transmission unit 154 transmits, to the information processing device 100, the outline information of the user U1 which information is detected by the image sensor 171 of the sensor unit 17.

The transmission unit 154 transmits the input information input by the user to the information processing device 100. The transmission unit 154 transmits, to the information processing device 100, the input information voice input of which is performed by the user. The transmission unit 154 transmits the input information input by operation by the user to the information processing device 100.

The transmission unit 154 transmits, to the information processing device 100, the outline information indicating the outline of the user who makes the body motion. The transmission unit 154 transmits the outline information detected by the sensor unit 17 to the information processing device 100. The transmission unit 154 transmits, to the information processing device 100, the outline information that is the image information detected by the image sensor 171. The transmission unit 154 transmits the speech information of the user to the information processing device 100. The transmission unit 154 transmits, to the information processing device 100, the outline information of the user who performs the input by the body motion.

The display unit 16 is provided in the terminal device 10 and displays various kinds of information. The display unit 16 is realized by, for example, a liquid crystal display, an organic electro-luminescence (EL) display, or the like. The display unit 16 may be realized by any means as long as the information provided from the information processing device 100 can be displayed. The display unit 16 displays the various kinds of information under the control by the execution unit 152.

The display unit 16 displays content. The display unit 16 displays the content received by receiving unit 151.

The sensor unit 17 detects predetermined information. The sensor unit 17 detects the outline information indicating the outline of the user who makes the body motion. The sensor unit 17 includes the image sensor 171 as a means to detect the outline information indicating the outline of the user who makes the body motion. By the image sensor 171, the sensor unit 17 detects the outline information that is the image information. The sensor unit 17 detects the speech of the user. The sensor unit 17 detects the outline information of the user who performs the input by the body motion.

Furthermore, the sensor unit 17 is not limited to the image sensor 171, and may include any sensor as long as the outline information of the user can be detected. An optical ranging sensor, an acoustic wave sensor using an ultrasonic wave, or the like may be included as a sensor that detects the outline information of the user. For example, the sensor unit 17 may include a LiDAR, a ToF sensor, or the like. Furthermore, as the sensor that detects the outline information of the user, the sensor unit 17 may include a sensor that detects heat, such as a thermal sensor.

Furthermore, the sensor unit 17 is not limited to the above, and may include various sensors. The sensor unit 17 may include a sensor (position sensor) that detects position information, such as a global positioning system (GPS) sensor. Note that the sensor unit 17 is not limited to the above, and may include various sensors.

1-5. Procedure of the Information Processing According to the First Embodiment Next, a procedure of various kinds of information processing according to the first embodiment will be described with reference to FIG. 7 and FIG. 8.

Figure 7:
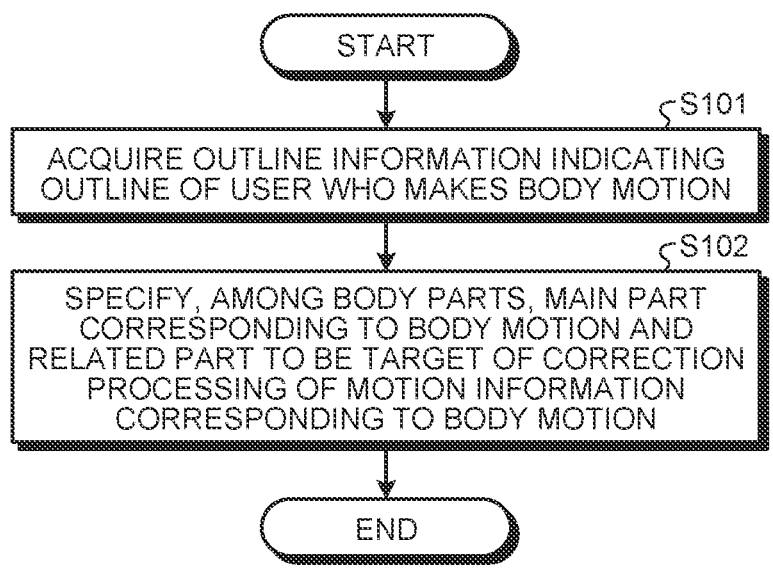
FIG. 7 is a flowchart illustrating a processing procedure of the information processing device according to the first embodiment of the present disclosure.

1-5-1. Procedure of Processing Related to the Information Processing Device First, a flow of processing related to the information processing device according to the first embodiment of the present disclosure will be described with reference to FIG. 7. FIG. 7 is a flowchart illustrating a processing procedure of the information processing device according to the first embodiment of the present disclosure. Specifically, FIG. 7 is a flowchart illustrating a procedure of information processing by the information processing device 100.

As illustrated in FIG. 7, the information processing device 100 acquires outline information indicating an outline of a user who makes a body motion (Step S101). Then, on the basis of the outline information, the information processing device 100 specifies, among body parts, a main part corresponding to the body motion and a related part to be a target of correction processing of motion information corresponding to the body motion (Step S102).

Figure 8:
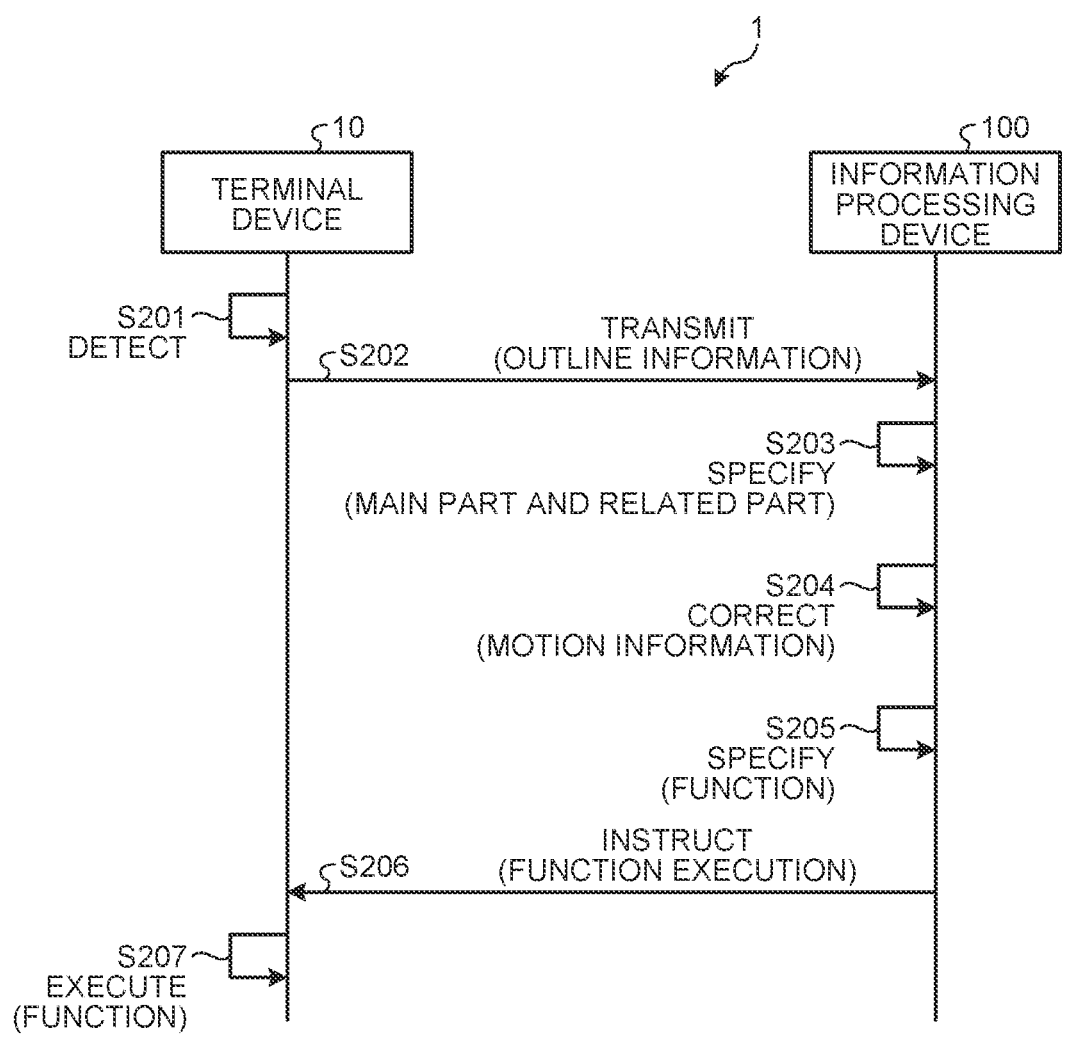
FIG. 8 is a sequence diagram illustrating a processing procedure of the information processing system according to the first embodiment of the present disclosure.

1-5-2. Procedure of Processing Related to the Information Processing System Next, a flow of processing related to the information processing system according to the first embodiment of the present disclosure will be described with reference to FIG. 8. FIG. 8 is a sequence diagram illustrating a processing procedure of the information processing system according to the first embodiment of the present disclosure.

As illustrated in FIG. 8, the terminal device 10 detects the outline information indicating the outline of the user who makes the body motion (Step S201). For example, the terminal device 10 acquires the image information of the user which information is detected by the image sensor 171. Then, the terminal device 10 transmits, to the information processing device 100, the outline information indicating the outline of the user who makes the body motion (Step S202).

On the basis of the outline information acquired from the terminal device 10, the information processing device 100 specifies, among the body parts, the main part corresponding to the body motion and the related part to be the target of the correction processing of the motion information corresponding to the body motion (Step S203). Then, the information processing device 100 corrects the motion information of the specified parts (Step S204). Then, the information processing device 100 specifies the function on the basis of the corrected motion information (Step S205).

Then, the information processing device 100 instructs the terminal device 10 to execute the specified function (Step S206). The information processing device 100 instructs the terminal device 10 to execute the specified function by transmitting information indicating the specified function to the terminal device 10. Then, the terminal device 10 executes the function according to the instruction from the information processing device 100 (Step S207).

1-6. Example of Part Specification Using Speech

The information processing device 100 may specify the main part and the related part by using not only the outline information but also various kinds of information as appropriate. This point will be described below. Note that description of points similar to those in FIG. 1 will be omitted as appropriate in the following description.

First, a case where intent of the user is added to a message by voice speech and body motion will be described with FIG. 1 as an example. In this case, a case where the user makes a motion of tilting the head together with the speech in the example of FIG. 1 will be described as an example. It is assumed that the information processing system 1 can recognize speech information of the speech of the user and estimate contents of the speech by the functions of natural language understanding and automatic speech recognition (ASR). Note that any device of the information processing system 1 may have the functions of natural language understanding and automatic speech recognition. For example, the functions of natural language understanding and automatic speech recognition may be included in the information processing device 100 and the terminal device 10. Furthermore, the information processing system 1 may include a speech recognition server having the functions of natural language understanding and automatic speech recognition.

The user U1 who uses the terminal device 10 speaks "coming back at 7:00". The terminal device 10 detects the speech "coming back at 7:00" by the user U1. Then, the terminal device 10 transmits character information "coming back at 7:00" generated by the function of automatic speech recognition to the information processing device 100. As a result, the information processing device 100 acquires the character information "coming back at 7:00" corresponding to the speech of the user U1.

In addition, the user U1 makes a body motion of tilting the head. The user U1 makes the body motion of tilting the head after the speech "coming back at 7:00". The information processing device 100 acquires, as the outline information, a plurality of pieces of image information indicating the motion of the user corresponding to the state ST1 to state ST2. The information processing device 100 acquires, as the outline information, the image information corresponding to the state ST1 before the speech of the user U1 and the image information corresponding to the state ST2 after the speech of the user U1. As a result, the information processing device 100 acquires, as the outline information, the plurality of pieces of image information such as the image information corresponding to the state ST1 and the image information corresponding to the state ST2.

The information processing device 100 estimates intent of the character information "coming back at 7:00" by the function of natural language understanding. Furthermore, the information processing device 100 specifies the intent of the user U1 on the basis of the body motion of tilting the head by the user. On the basis of the body motion of tilting the head by the user, the information processing device 100 specifies that the intent is to ask the contents of the character information "coming back at 7:00". As a result, the information processing device 100 generates a message "coming back at 7:00?" in which "?" is added to the character information "coming back at 7:00".

In such a manner, the information processing device 100 can more accurately estimate the intent of the user on the basis of the motion of the user. Furthermore, the information processing device 100 can appropriately generate information such as the character information by using the intent of the user which intent is estimated on the basis of the motion of the user.

Figure 9:
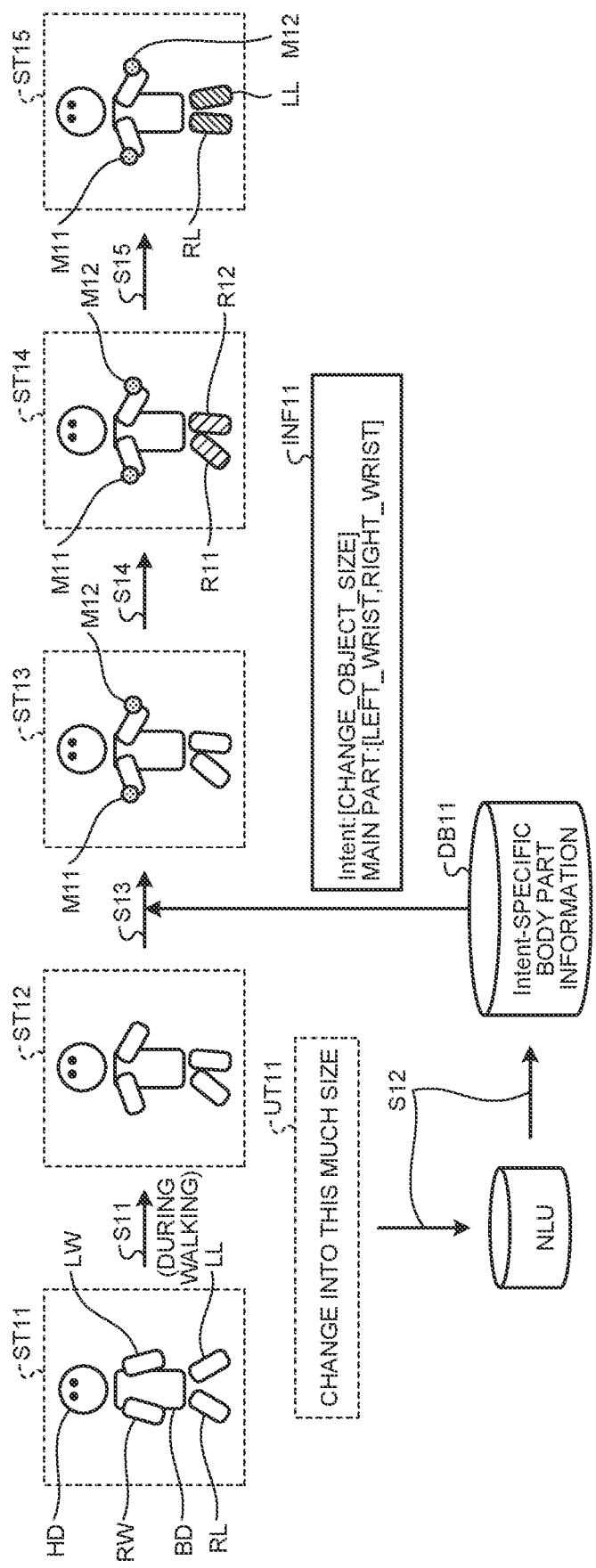
FIG. 9 is a view illustrating an example of part specification using speech.

The information processing device 100 may switch the main part according to the speech contents. This point will be described with reference to FIG. 9. FIG. 9 is a view illustrating an example of part specification using speech. FIG. 9 is a view illustrating an example of specifying the main part by using the speech information. The information processing device 100 estimates (acquires) the intent (Intent) of the user from the contents of the voice speech, specifies a main part associated with the intent (speech intent) of the user, specifies an unnecessary motion, and cancels the motion. As an example of the use case, a case where the user speaks "change into this much size" while walking and expresses the size with both hands is illustrated in FIG. 9.

In the example of FIG. 9, the user U1 performs movement corresponding to a state ST11 to a state ST12 by walking (Step S11). Then, the user U1 makes a motion of spreading the right wrist RW and the left wrist LW while walking, and makes speech UT1 "change into this much size".

Then, the information processing device 100 estimates the intent of the speech of the user by the function of natural language understanding (NLU), and acquires body part information corresponding to the estimated intent (Intent) (Step S12). The information processing device 100 acquires the body part information corresponding to the estimated intent (Intent) from a database DB11 that stores Intent-specific body part information. For example, the information processing device 100 acquires the body part information corresponding to the estimated intent (Intent) from the storage unit 120 that stores the Intent-specific body part information.

In the example of FIG. 9, the information processing device 100 estimates that the intent of the speech UT1 by the user is intent of changing a size of an object. Then, the information processing device 100 extracts, from the database DB11, the Intent-specific body part information that is the Intent "CHANGE_OBJECT_SIZE" corresponding to the estimated intent (Intent). The information processing device 100 extracts Intent-specific body part information INF11 which is Intent "CHANGE_OBJECT_SIZE" and main parts of which are "LEFT_WRIST" and "RIGHT_WRIST". Note that "LEFT_WRIST" may be synonymous with "L_WRIST", and "RIGHT_WRIST" may be synonymous with "R_WRIST".

On the basis of the intent of the speech of the user U1, the information processing device 100 specifies, as main parts, the right wrist RW and the left wrist LW having a smaller amount of change in positions than the right leg RL and the left leg LL instead of the right leg RL and the left leg LL having a large amount of change in positions between the state ST11 and the state ST12. As a result, as indicated in a state ST13, the information processing device 100 specifies the right wrist RW as a main part M11 and specifies the left wrist LW as a main part M12 (Step S13).

Then, the information processing device 100 specifies a related part (Step S14). The information processing device 100 specifies, as the related part, a moving part among parts other than the main parts M11 and M12 corresponding to the speech intent of the user U1. In the example of FIG. 9, as indicated in a state ST14, the information processing device 100 specifies the right leg RL as a related part R11 and specifies the left leg LL as a related part R12.

Then, the information processing device 100 performs processing of correcting the motion (Step S15). The information processing device 100 performs a correction of cancelling the motion of the related part. In the example of FIG. 1, the information processing device 100 performs a correction of cancelling the motion of the right leg RL that is the related part R11 and the left leg LL that is the related part R12. That is, the information processing device 100 performs a correction of returning the positions of the right leg RL and the left leg LL in the state ST12 to the positions of the right leg RL and the left leg LL in the state ST11. As a result, the information processing device 100 corrects the state ST12 before the correction to a state in which the positions of the right leg RL and the left leg LL are returned to the positions of the state ST1 and the right wrist RW and the left wrist LW are spread as in a state ST15 after the correction.

Then, by using motion information corresponding to the state ST15, the information processing device 100 estimates the intent of the input by the body motion of the user. For example, the information processing device 100 specifies the intent of the input by the body motion of the user by inputting the motion information corresponding to the state ST15 to a detector or the like.

In such a manner, the information processing device 100 estimates the Intent of the speech from the intent analysis of the speech of the user, and specifies the main part from the Intent-specific body part information. Then, the information processing device 100 controls/cancels the motion of the body part which motion is not to be used as the input, and performs processing.

For example, in a case where a portion having a large amount of motion is simply set as the main part, there is a case where the amount of motion of a part other than the intended main part becomes s larger, for example, during walking or the like. In such a case, there is a case where a correct input cannot be performed or the intent of the user cannot be appropriately estimated.

On the other hand, the information processing device 100 can receive a correct input by controlling/canceling the motion of the body part, which motion is not to be used as the input, and performing the processing, and can appropriately estimate the intent of the user.

2. Second Embodiment

Hereinafter, the second embodiment will be described. The second embodiment indicates a case where a motion is emphasized. Furthermore, in the second embodiment, a case where a user is caused to use a body motion to move a virtual character such as an avatar will be described as an example. Note that description of points similar to those in the first embodiment will be omitted as appropriate. In the second embodiment, an information processing system 1 includes an information processing device 100A instead of the information processing device 100.

2-1. Outline of Information Processing According to the Second Embodiment

Figure 10:
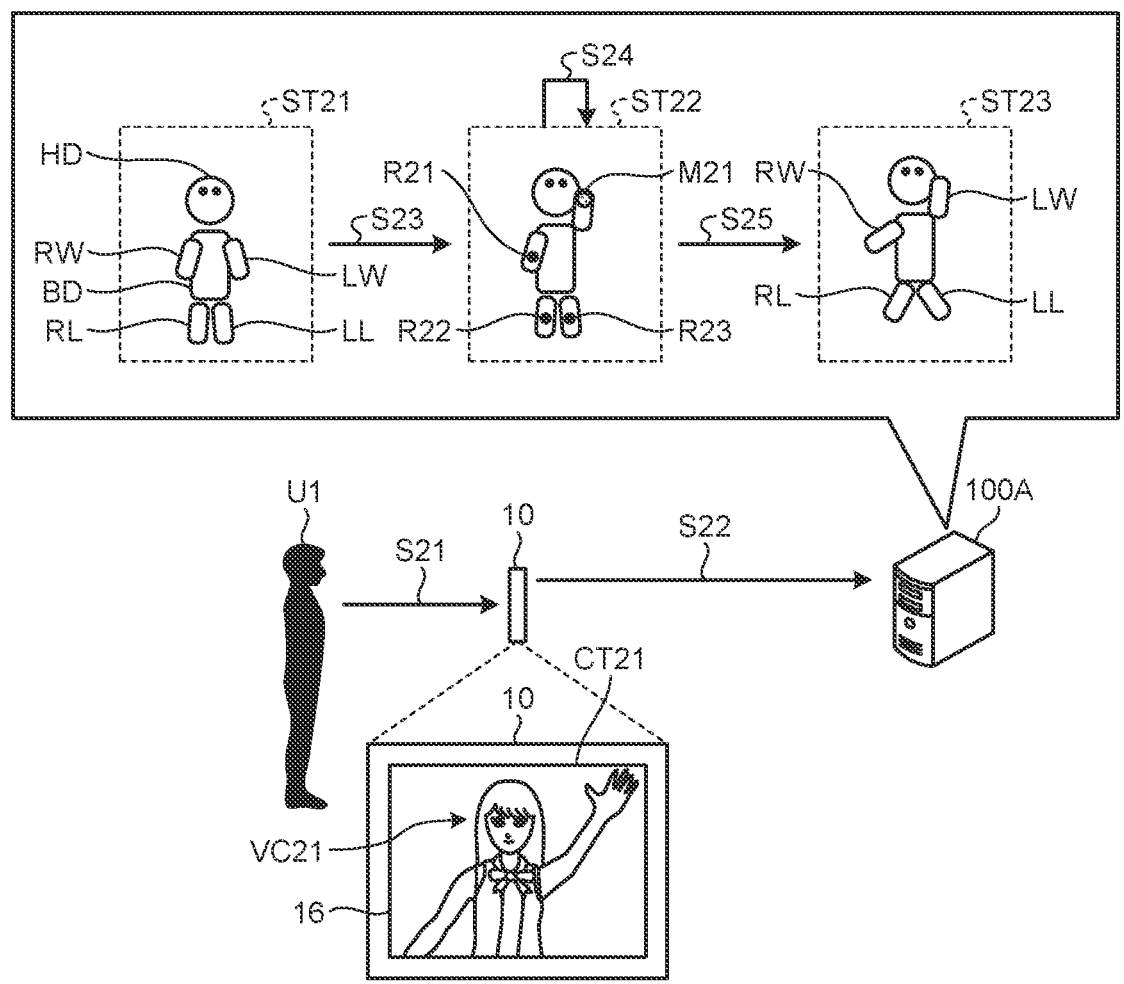
FIG. 10 is a view illustrating an example of information processing according to a second embodiment of the present disclosure.

FIG. 10 is a view illustrating an example of the information processing according to the second embodiment of the present disclosure. The information processing according to the second embodiment of the present disclosure is realized by the information processing system 1 including the information processing device 100A and a terminal device 10 illustrated in FIG. 2. An example of emphasizing a motion with predefined data is illustrated in FIG. 10. The information processing device 100A emphasizes motion data of a user along the predefined data. As an example of the use case, a case of reproducing a motion feature of an avatar by emphasizing insufficient motion information when the motion information is transferred to the avatar or the like is illustrated in FIG. 10.

In the example of FIG. 10, a case where content CT21 including a virtual character VC21, which is an idol character (avatar) of a woman in her twenties and which moves in accordance with a body motion of a user U1, is displayed on a display unit 16 of the terminal device 10 is illustrated. For example, in a case where the idol character (avatar) such as the virtual character VC21 is operated in accordance with the body motion of the user, there is a case where transferring the body motion of the user as it is as a motion of the avatar is insufficient for the motion of the avatar. For example, in the example of FIG. 10, an attribute of the virtual character VC21 is the woman in her twenties, and an attribute of the user U1 is a man in his fifties. Thus, in a case where the idol character (avatar) such as the virtual character VC21 of the young woman is operated in accordance with the body motion of the user U1 who is the middle-aged man, there is a case where transferring the body motion of the user U1 as it is as the motion of the avatar is insufficient for the motion of the avatar. Thus, the information processing device 100A causes the avatar to make a motion suitable for the avatar by performing a correction in such a manner as to emphasize the motion of the user as follows.

Note that although a case where only an upper body of the virtual character VC21 is displayed on the display unit 16 of the terminal device 10 is illustrated in order to illustrate a motion of raising a left wrist of the user U1 in the example of FIG. 10, the whole body of the virtual character VC21 may be displayed. For example, the terminal device 10 may display the whole body of the virtual character VC21 according to an instruction or the like of the user U1. Furthermore, although a case where the terminal device 10 that detects the motion of the user U1 displays the content CT21 is illustrated in the example of FIG. 10, a terminal device 10 different from the terminal device 10 that detects the motion of the user U1 may display the content CT21.

First, in the example of FIG. 10, the terminal device 10 detects image information acquired by imaging of the user U1 by an image sensor 171 (Step S21). Then, the terminal device 10 transmits the detected image information as outline information to the information processing device 100A (Step S22). For example, the terminal device 10 transmits, as the outline information, moving image information including a plurality of pieces of continuously-captured image information to the information processing device 100A. For example, the terminal device 10 transmits, as the outline information, moving image information including a plurality of frames to the information processing device 100A.

As a result, the information processing device 100A acquires, as the outline information, the moving image information including the plurality of frames. The information processing device 100A acquires the outline information indicating the body motion of the user U1. In the example of FIG. 10, the information processing device 100A acquires, as the outline information, a plurality of pieces of image information such as image information corresponding to a state ST21 and image information corresponding to a state ST22.

The information processing device 100A that acquires the outline information performs processing of specifying a part corresponding to the body motion of the user U1 by using the outline information. First, the information processing device 100A specifies a main part corresponding to the body motion of the user U1 (Step S23). In the example of FIG. 10, the information processing device 100A specifies, as a main part M21, a left wrist LW that is a part having a large amount of change between the state ST21 and the state ST22 among body parts of the user U1.

Furthermore, the information processing device 100A specifies a motion type of the user U1 between the state ST21 and the state ST22 (Step S24). The information processing device 100A specifies the motion type of the user U1 on the basis of a motion of the left wrist LW that is the main part M21 between the state ST21 and the state ST22. In the example of FIG. 10, since the user U1 performs the motion of raising a left hand between the state ST21 and the state ST22, the information processing device 100A specifies the motion type as "RAISE".

Then, the information processing device 100A specifies a related part to be a target of correction processing of motion information corresponding to the body motion. The information processing device 100A specifies the related part on the basis of the left wrist LW, which is the main part M21, and the motion type "RAISE". For example, the information processing device 100A specifies the related part by using definition information indicating association between the main part and the related part. For example, the information processing device 100A specifies the related part by using, among pieces of the definition information, association information in which a combination of a main part "LEFT_WRIST" indicating the left wrist and a motion type "RAISE" and the related part are associated with each other. As a result, the information processing device 100A specifies a right wrist RW, a right leg RL, and a left leg LL of the user U1 as related parts corresponding to the motion of raising the left hand by the user U1.

For example, the definition information may include information in which each of the right wrist RW, the right leg RL, and the left leg LL, which are related parts, is associated with correction amount information indicating how much each part is to be corrected. For example, the definition information may include information in which the correction amount information indicating how much the right wrist RW, which is the related part, is emphasized according to the motion of raising the left wrist LW is associated with the related part "RIGHT_WRIST". For example, the definition information may include information in which the correction amount information indicating how much the right leg RL, which is the related part, is emphasized according to the motion of raising the left wrist LW is associated with the related part "RIGHT_LEG". For example, the definition information may include information in which the correction amount information indicating how much the left leg LL, which is the related part, is emphasized according to the motion of raising the left wrist LW is associated with the related part "LEFT_LEG".

Then, the information processing device 100A performs processing of correcting the motion (Step S25). The information processing device 100A performs correction of emphasizing the motion of the related part. In the example of FIG. 10, the information processing device 100A performs the correction of emphasizing the motions of the right wrist RW that is the related part R21, the right leg RL, and the left leg LL. For example, the information processing device 100A performs the correction of emphasizing the motion of the related part by using the correction amount information included in the definition information.

For example, the information processing device 100A performs the correction of respectively moving the positions of the right wrist RW, the right leg RL, and the left leg LL in the state ST22 in directions of becoming further away from the positions of the right wrist RW, the right leg RL, and the left leg LL in the state ST21. For example, the information processing device 100A performs correction of moving the position of the right wrist RW in the state ST22 in a direction of being further spread from a body BD. For example, the information processing device 100A performs the correction of moving the right leg RL and the left leg LL in the state ST22 in directions of becoming further inward. Note that the above emphasis is an example, and an emphasis mode may vary depending on the attribute of the avatar.

As a result, the information processing device 100A corrects the state ST22 before the correction to a state ST23 after the correction in which the positions of the right wrist RW, the right leg RL, and the left leg LL are corrected to positions suitable for the motion of the virtual character VC21 that is the idol character (avatar) of the woman in her twenties. In other words, by making emphasis in such a manner that the motion information based on the motion of the user U1 matches the motion of the virtual character VC21 that is the idol character (avatar) of the woman in her twenties, the information processing device 100A can perform the correction to the motion suitable for the avatar. As a result, the information processing device 100A can correct the motion information to the motion information suitable for the attribute of the avatar, and can make it possible to provide a service using the avatar that makes a more appropriate motion.

Note that the information processing device 100A may emphasize the main part in a case where the motion thereof is insufficient. For example, in a case where a raising manner is insufficient, such as when the user U1 raises the left hand obliquely, the information processing device 100A may emphasize the motion information in such a manner that the left wrist LW is raised upward as the position of the left wrist LW is indicated in the state ST23.

2-1-1. Background and Effects

When the motion of the user is directly transferred to the avatar or the like having a character property, the character property may be impaired. Furthermore, there is a case where a restriction such as not being able to perform operation while sitting is generated, such as a case where whole-body information is used.

On the other hand, the information processing device 100A emphasizes the motion data of the user by using the predefined data as described above. As a result, when transferring the motion information to the avatar or the like, the information processing device 100A can reproduce the motion feature of the avatar and control impairment of the character property of the avatar or the like by emphasizing insufficient motion information.

Figure 11:
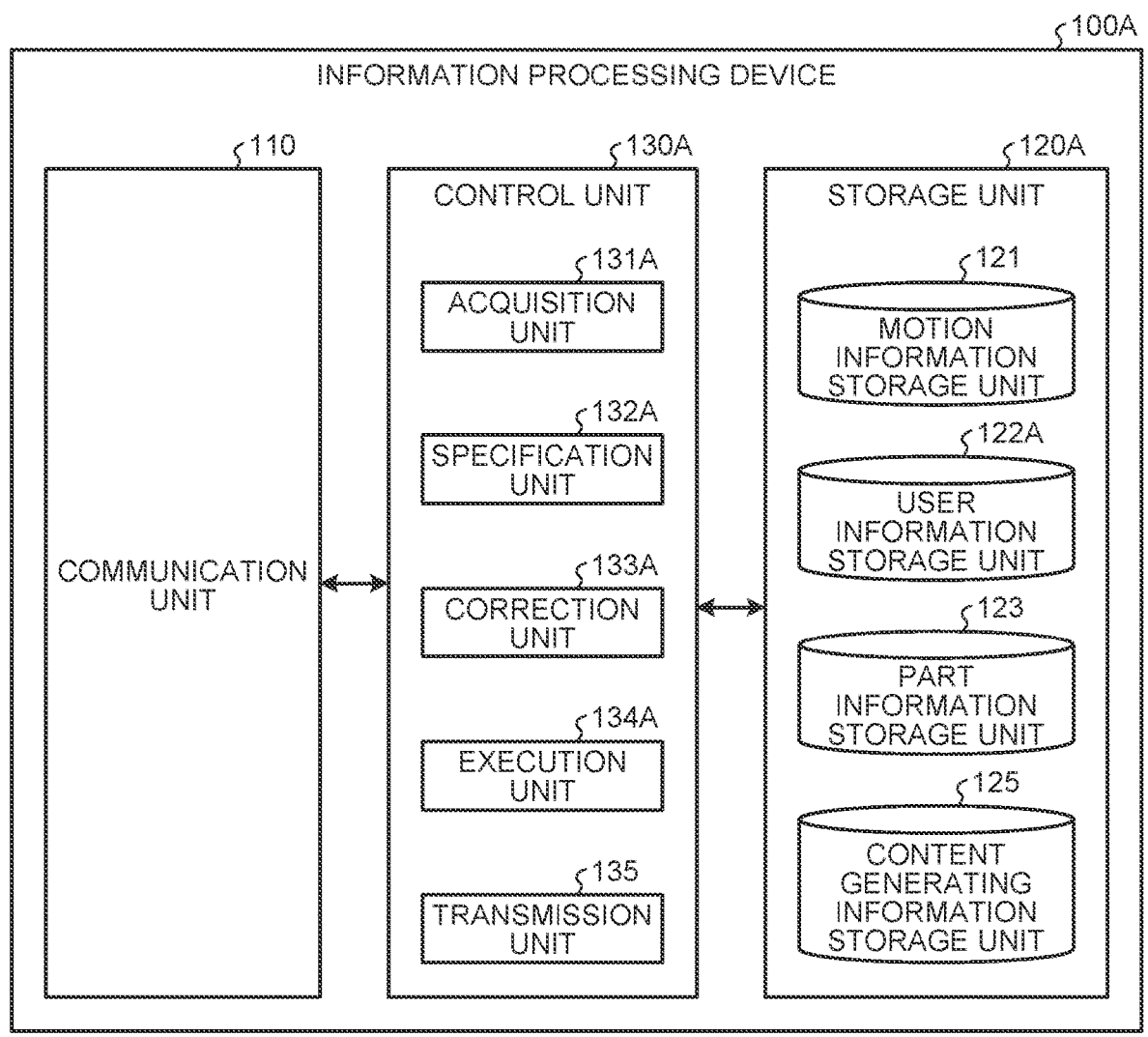
FIG. 11 is a view illustrating a configuration example of an information processing device according to the second embodiment of the present disclosure.

2-2. Configuration of an Information Processing Device According to the Second Embodiment Next, a configuration of the information processing device 100A, which is an example of the information processing device that executes the information processing according to the second embodiment, will be described. FIG. 11 is a view illustrating a configuration example of the information processing device according to the second embodiment of the present disclosure.

As illustrated in FIG. 11, the information processing device 100A includes a communication unit 110, a storage unit 120A, and a control unit 130A.

The storage unit 120A is realized, for example, by a semiconductor memory element such as a RAM or a flash memory, or a storage device such as a hard disk or an optical disk. As illustrated in FIG. 11, the storage unit 120A according to the second embodiment includes a motion information storage unit 121, a user information storage unit 122A, a part information storage unit 123, and a content generating information storage unit 125.

The motion information storage unit 121 according to the second embodiment stores information in a manner illustrated in FIG. 4. The motion information storage unit 121 according to the second embodiment stores motion information including "attribute information" illustrated in FIG. 4. The "attribute information" illustrated in FIG. 4 indicates attribute information of a character (avatar) or the like assumed by this motion data. Pieces of data DT1 to DT3 in FIG. 4 are respectively prepared for characters or avatars. Furthermore, a plurality of user attributes to be applied may also be prepared. In addition, what is close to an attribute of a user is selected.

As described above, in a case of being used for a motion of the virtual character, the body motion of the user is included in the attribute information of the virtual character in the motion information storage unit 121 as illustrated in FIG. 4. The "attribute information" in the data DT1 in FIG. 4 indicates attribute information of a virtual character which is a woman in her twenties and has a body shape of "TYPE2". That is, it is indicated that the data DT1 is motion information for causing the virtual character, which is the woman in her twenties and has the body shape of "TYPE2", to move. For example, the information of the "attribute information" in the data DT1 in FIG. 4 corresponds to the attribute information of the virtual character VC21 illustrated in FIG. 10.

The user information storage unit 122A stores information similar to that of the user information storage unit 122. The user information storage unit 122A stores motion information of each user. The user information storage unit 122A may store information indicating association between each user and the virtual character.

The content generating information storage unit 125 according to the second embodiment stores various kinds of information used for generation of content. The content generating information storage unit 125 stores various kinds of information used for generation of the virtual character. The content generating information storage unit 125 stores various kinds of information used for generation of content including the virtual character. The content generating information storage unit 125 stores an editing history related to the motion of the virtual character.

For example, the content generating information storage unit 125 stores information used for generation of content to be displayed on a display device such as the terminal device 10. For example, the content generating information storage unit 125 stores image information used for generation of the content. For example, the content generating information storage unit 125 may store images in various formats such as Joint Photographic Experts Group (JPEG), Graphics Interchange Format (GIF), and Portable Network Graphics (PNG) as the image information used for generation of the content. Furthermore, the content generating information storage unit 125 may store information in a format of Cascading Style Sheets (CSS), JavaScript (registered trademark), or HyperText Markup Language (HTML) as image information used for generation of the content. Note that the content generating information storage unit 125 may store not only the above but also various kinds of information depending on a purpose.

As illustrated in FIG. 11, the control unit 130A includes an acquisition unit 131A, a specification unit 132A, a correction unit 133A, an execution unit 134A, and a transmission unit 135, and realizes or executes a function and an action of information processing described below.

The acquisition unit 131A acquires various kinds of information similarly to the acquisition unit 131. The acquisition unit 131A acquires the various kinds of information. The acquisition unit 131A acquires outline information of the user who moves the virtual character by the body motion. As information used for a correction of the motion information of the virtual character, the acquisition unit 131A acquires motion information of a corresponding user corresponding to the attribute set for the virtual character. As the information used for the correction of the motion information of the virtual character, the acquisition unit 131A acquires an editing history related to the motion of the virtual character.

The specification unit 132A specifies various kinds of information similarly to the specification unit 132. The specification unit 132A specifies a main part corresponding to the motion of the virtual character and a related part to be a target of correction processing. The specification unit 132A specifies the main part and the related part on the basis of the motion information of the corresponding user corresponding to the attribute set for the virtual character. The specification unit 132A specifies the main part and the related part on the basis of the editing history related to the motion of the virtual character.

The correction unit 133A corrects various kinds of information similarly to the correction unit 133. The correction unit 133A performs correction of emphasizing the motion of the main part or the related part. The correction unit 133A corrects the motion information of the virtual character on the basis of the editing history related to the motion of the virtual character. The correction unit 133A corrects the motion information of the virtual character by using the editing history. The correction unit 133A corrects the motion information of the virtual character by using a tendency of past correction included in the editing history. For example, the correction unit 133A applies, to the motion information of the virtual character to be corrected, correction contents of motion information similar to the motion information of the virtual character to be corrected (similar motion information) in the editing history. The correction unit 133A corrects the motion information of the virtual character to be corrected with the correction contents of the similar motion information.

The execution unit 134A executes various kinds of information similarly to the execution unit 134. The execution unit 134A generates various kinds of information similarly to the execution unit 134.

The execution unit 134A generates the various kinds of information on the basis of the various kinds of information acquired by the acquisition unit 131. The execution unit 134A generates the various kinds of information on the basis of the various kinds of information determined by the specification unit 132. The execution unit 134A generates the various kinds of information on the basis of the various kinds of information corrected by the correction unit 133. The execution unit 134A generates the motion information of the virtual character on the basis of the motion information of the corresponding user corresponding to the attribute set for the virtual character. The execution unit 134A generates the motion information of the virtual character by using the motion information of the similar user similar to the attribute set for the virtual character. The execution unit 134A generates the motion information of the virtual character by using a tendency of the motion of the similar user. For example, the execution unit 134A generates the motion information of the virtual character in such a manner as to be similar to the motion information of the similar user. The execution unit 134A generates the motion information of the virtual character, which is a target of the generation, in such a manner as to be closer to the motion information of the similar user.

By appropriately using various technologies, the execution unit 134A generates the various kinds of information such as a screen (image information) to be provided to an external information processing device. The execution unit 134A generates a screen (image information) or the like to be provided to the terminal device 10. For example, the execution unit 134A generates the screen (image information) or the like to be provided to the terminal device 10 on the basis of the information stored in the storage unit 120. The execution unit 134A generates the content CT21 including the virtual character VC21. The execution unit 134A may generate the content (image information) or the like by any kind of processing as long as the content (image information) or the like to be provided to the external information processing device can be generated. For example, the execution unit 134A generates the content (image information) to be provided to the terminal device 10 by appropriately using various technologies related to image generation, image processing, and the like. For example, the execution unit 134A generates the content (image information) to be provided to the terminal device 10 by appropriately using various technologies such as Java (registered trademark). Note that the execution unit 134A may generate the content (image information) to be provided to the terminal device 10 on the basis of a format of CSS, JavaScript (registered trademark), or HTML. Furthermore, for example, the execution unit 134A may generate the content (image information) in various formats such as JPEG, GIF, and PNG.

The transmission unit 135 transmits the content generated by the execution unit 134A to the terminal device 10. For example, the transmission unit 135 transmits the content CT21 including the virtual character VC21 to the terminal device 10.

2-3. Example of Part Specification Using Speech

The information processing device 100A may specify the main part and the related part by using not only the outline information but also various kinds of information as appropriate. This point will be described below. Note that description of points similar to those in FIG. 10 will be omitted as appropriate in the following description.

Figure 12:
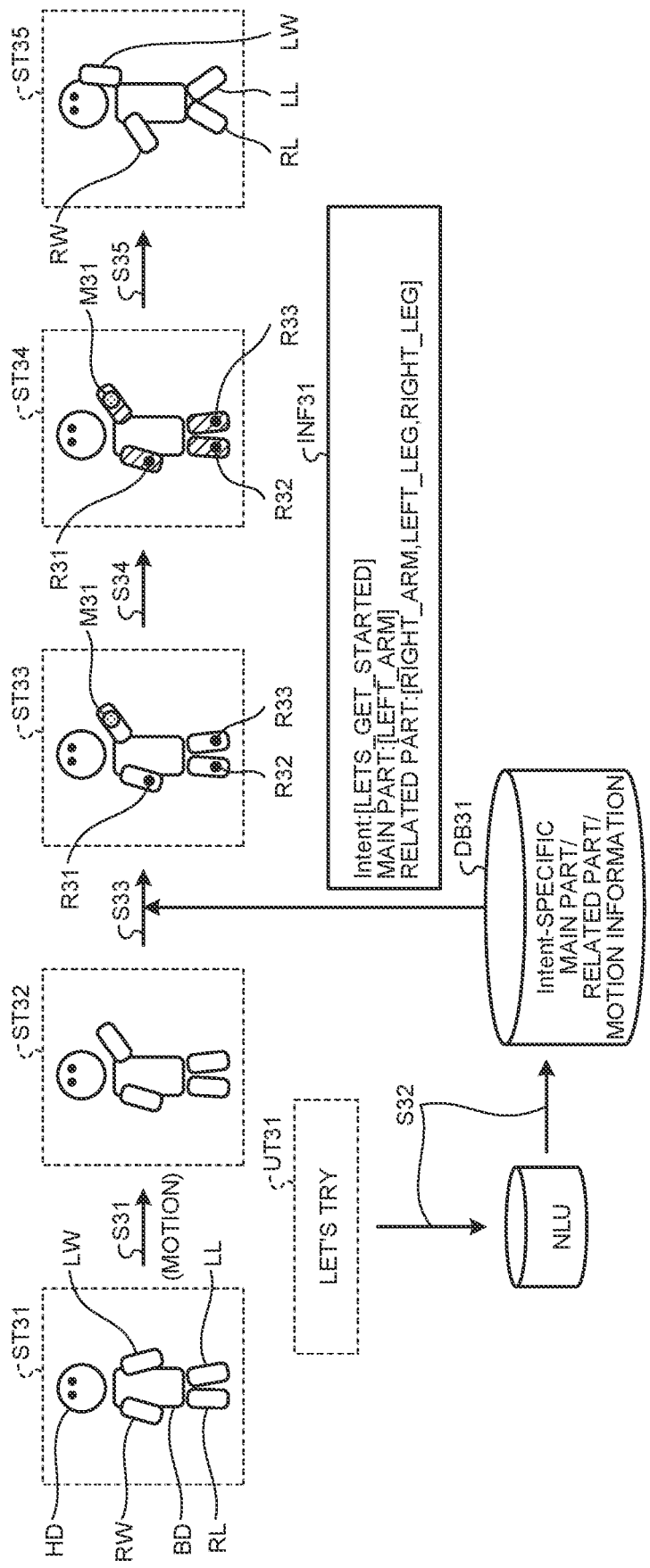
FIG. 12 is a view illustrating an example of part specification using speech.

The information processing device 100A may emphasize a body part in consideration of speech contents. This point will be described with reference to FIG. 12. FIG. 12 is a view illustrating an example of part specification using speech. FIG. 12 is a view illustrating an example of specifying the main part by using speech information. The information processing device 100A estimates (acquires) intent (Intent) of the user from contents of voice speech, and selects motion data to be used for specification and emphasis of the main part. As an example of the use case, a case where motion information of a portion to be emphasized is selected and used in a case where a motion of raising a hand is made while speech "let's try" is made at the time of usage of the idol avatar (such as virtual character VC21 in FIG. 10) is illustrated in FIG. 12.

In the example of FIG. 12, the user U1 makes a motion of raising the left hand of the user U1 corresponding to a state ST31 to a state ST32 (Step S31). Then, the user U1 makes speech UT31 "let's try" together with the motion of raising the left hand of the user U1.

Then, the information processing device 100A estimates intent of the speech of the user by the function of natural language understanding (NLU), and acquires information corresponding to the estimated intent (Intent) (hereinafter, also referred to as "part motion information") (Step S32). The information processing device 100A acquires part motion information corresponding to the estimated intent (Intent) from a database DB31 that stores Intent-specific main part/related part/motion information. For example, the information processing device 100A acquires part motion information corresponding to the estimated intent (Intent) from the storage unit 120 that stores the Intent-specific main part/related part/motion information.

In the example of FIG. 12, the information processing device 100A estimates that the intent of the speech UT31 by the user is intent of changing a size of an object. Then, the information processing device 100A extracts, from the database DB31, the Intent-specific main part/related part/motion information that is intent "LETS_GET_STARTED" corresponding to the estimated intent (Intent). The information processing device 100A extracts Intent-specific main part/related part/motion information INF31 which is Intent part "LETS_GET_STARTED" and in which the main part is "LEFT_ARM". Note that "LEFT_ARM" may be synonymous with "LEFT_WRIST" or "L_WRIST". The Intent-specific main part/related part/motion information INF31 may include information in which the correction amount information indicating how much each related part is corrected is associated with each related part (motion emphasis data).

The information processing device 100A specifies the left wrist LW as a main part on the basis of the intent of the speech of the user U1. As a result, the information processing device 100A specifies the right wrist RW as a main part M31 as indicated in a state ST33 (Step S33).

Then, the information processing device 100A specifies a related part (Step S34). The information processing device 100A specifies, as the related part, a moving part among parts other than the main part M31 corresponding to the speech intent of the user U1. In the example of FIG. 12, as indicated in the state ST33, the information processing device 100A specifies the right wrist RW as a related part R31, specifies the right leg RL as a related part R32, and specifies the left leg LL as a related part R33. For example, the information processing device 100A performs correction of emphasizing motions of the related parts by using the correction amount information included in the Intent-specific main part/related part/motion information INF31.

Then, the information processing device 100A performs processing of correcting the motions (Step S35). The information processing device 100A performs correction of emphasizing the motions of the related parts. In the example of FIG. 1, the information processing device 100A performs correction of emphasizing the motion of the right wrist RW that is the related part R31, the motion of the right leg RL that is the related part R32, and the motion of the left leg LL that is the related part R33. That is, the information processing device 100A performs correction of respectively moving the positions of the right wrist RW, the right leg RL, and the left leg LL in the state ST34 in directions of becoming further away from the positions of the right wrist RW, the right leg RL, and the left leg LL in the state ST32. For example, the information processing device 100A performs correction of moving the position of the right wrist RW in the state ST34 in a direction of being further spread from the body BD. For example, the information processing device 100A performs correction of moving the right leg RL and the left leg LL in the state ST34 in directions of becoming further inward. As a result, the information processing device 100A performs correction to a motion in which the motion of the hand is large and the legs are emphasized to be inward as illustrated in the state ST35.

Furthermore, in a case where since the user U1 raises a hand insufficiently and the motion of the left wrist LW that is the main part M31 is also insufficient, the information processing device 100A also emphasizes the motion of the left wrist LW. In the example of FIG. 12, since the user U1 raises the left hand obliquely and the raising manner is insufficient, the information processing device 100A emphasizes the motion information in such a manner that the left wrist LW is raised upward as the position of the left wrist LW is indicated in a state ST35. For example, the information processing device 100A performs correction of emphasizing the motion of the main part by using the correction amount information related to the main part included in the Intent-specific main part/related part/motion information INF31. In this case, the Intent-specific main part/related part/motion information INF31 includes information in which the correction amount information indicating how much each main part is corrected is associated with each main part (motion emphasis data).

In such a manner, the information processing device 100A estimates the Intent of the speech from the intent analysis of the speech of the user, and specifies the main part from the Intent-specific main part/related part/motion information. As a result, the information processing device 100A can appropriately specify the main part by using the speech information of the user even in a case where the main part cannot be specified only by a motion amount of a body part due to a reason that the motion of the main part which motion is made by the user is small, or the like. Then, the information processing device 100A makes emphasis by using the main part information and the motion emphasis data associated with Intent. As a result, the information processing device 100A can emphasize a motion of a main part having an insufficient motion, and emphasize a motion of a related part having an insufficient motion. In such a manner, the information processing device 100A can correct the motion information to the motion information suitable for the attribute of the avatar, and can make it possible to provide a service using the avatar that makes a more appropriate motion.

2-4. Example of Information Utilization According to an Attribute

Note that the above is an example, and various kinds of information may be appropriately used to specify a part and to correct a motion. This point will be described below. Note that description of points similar to those in the above description will be omitted as appropriate in the following description. Hereinafter, the following processing and the like may be performed by the information processing device 100 although the information processing device 100A will be described as an example.

Figure 13:
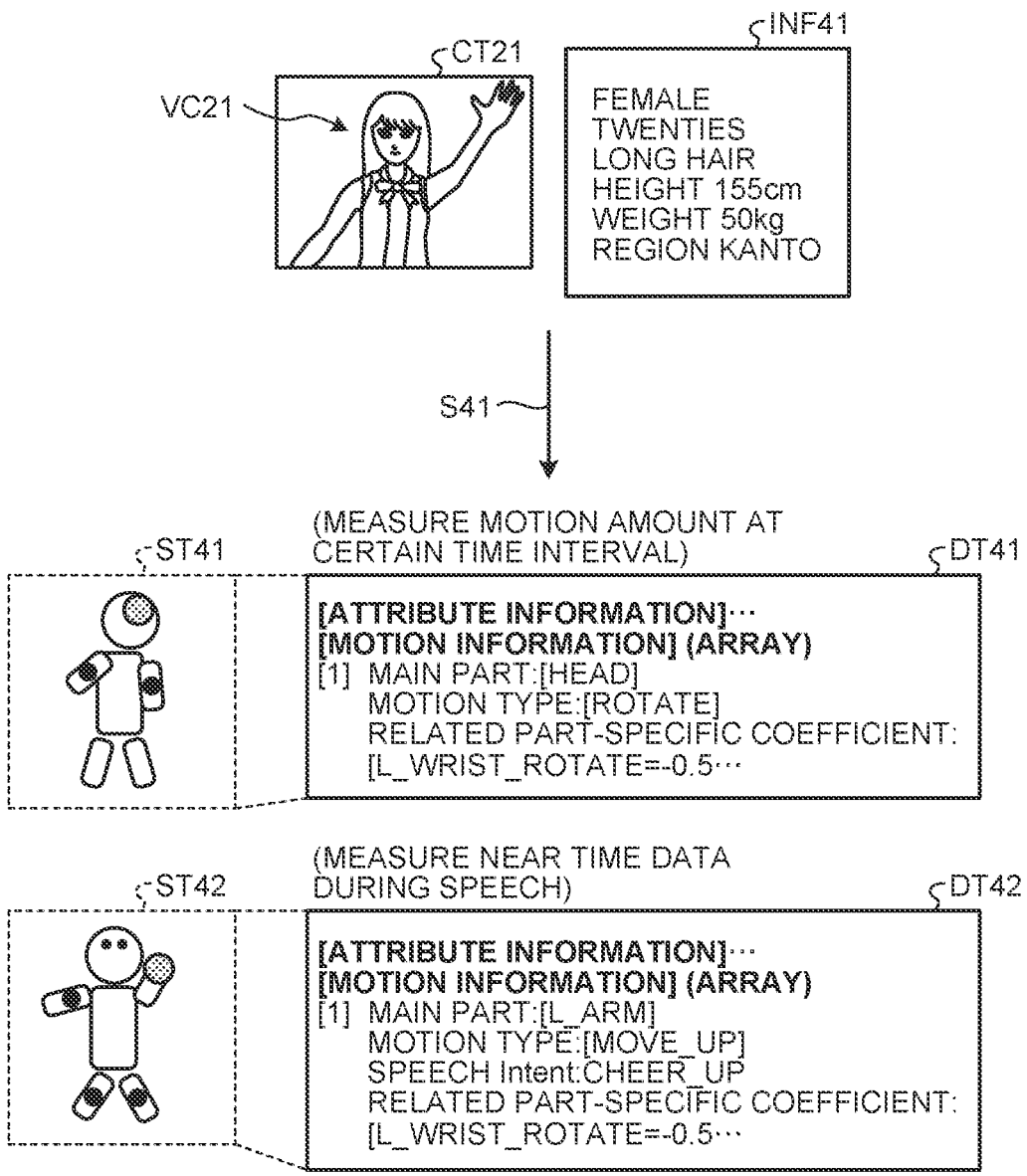
FIG. 13 is a view illustrating an example of information utilization according to an attribute.

For example, the information processing device 100A may use information according to an attribute. This point will be described with reference to FIG. 13. FIG. 13 is a view illustrating an example of information utilization according to an attribute. Hereinafter, as an example of the use case, a case where motion data that is not predefined is acquired will be described. In FIG. 13, an example of a method of automatically acquiring "main part/related part information" to be an information source for canceling/controlling/emphasizing a motion of a body part is illustrated, for example.

In the example of FIG. 13, as indicated in attribute information INF41, a case where the virtual character VC21 is set in such a manner that a gender is female, an age is in her twenties, a hairstyle is long hair, a height is 155 cm, a weight is 50 kg, and a place of residence is the Kanto region is illustrated.

The information processing device 100A generates data from a motion of a user having a close attribute (Step S41). The information processing device 100A generates data of the virtual character VC21 from a motion of a user close to the attribute of the virtual character VC21. The information processing device 100A generates data of the virtual character VC21 from a motion of a similar user similar to the attribute of the virtual character VC21. For example, the information processing device 100A extracts a female user in her twenties as the similar user, and generates the data of the virtual character VC21 from the motion of the similar user.

For example, the information processing device 100A measures a motion amount at certain time intervals with the similar user as a target. Then, the information processing device 100A stores the measured motion amount in the storage unit 120A in association with the virtual character VC21. The information processing device 100A stores data DT41 including the measured motion amount in association with the virtual character VC21. In association with the virtual character VC21, the information processing device 100A stores motion information indicating the motion amount in a manner illustrated in a state ST41.

For example, the information processing device 100A measures near time data at the time of speech with the similar user as the target. Then, the information processing device 100A stores the measured motion amount in the storage unit 120A in association with the virtual character VC21. In association with the virtual character VC21, the information processing device 100A stores data DT42 including the measured motion amount. In association with the virtual character VC21, the information processing device 100A stores motion information indicating the motion amount in a manner illustrated in a state ST42.

In such a manner, the information processing device 100A acquires, as data, the motion of the user having the same or similar attribute as the avatar setting. As a result, the information processing device 100A can automatically acquire information indicating a relationship between a main part and a related part and information indicating a motion amount of each part.

2-5. Motion Editing Example

Figure 14:
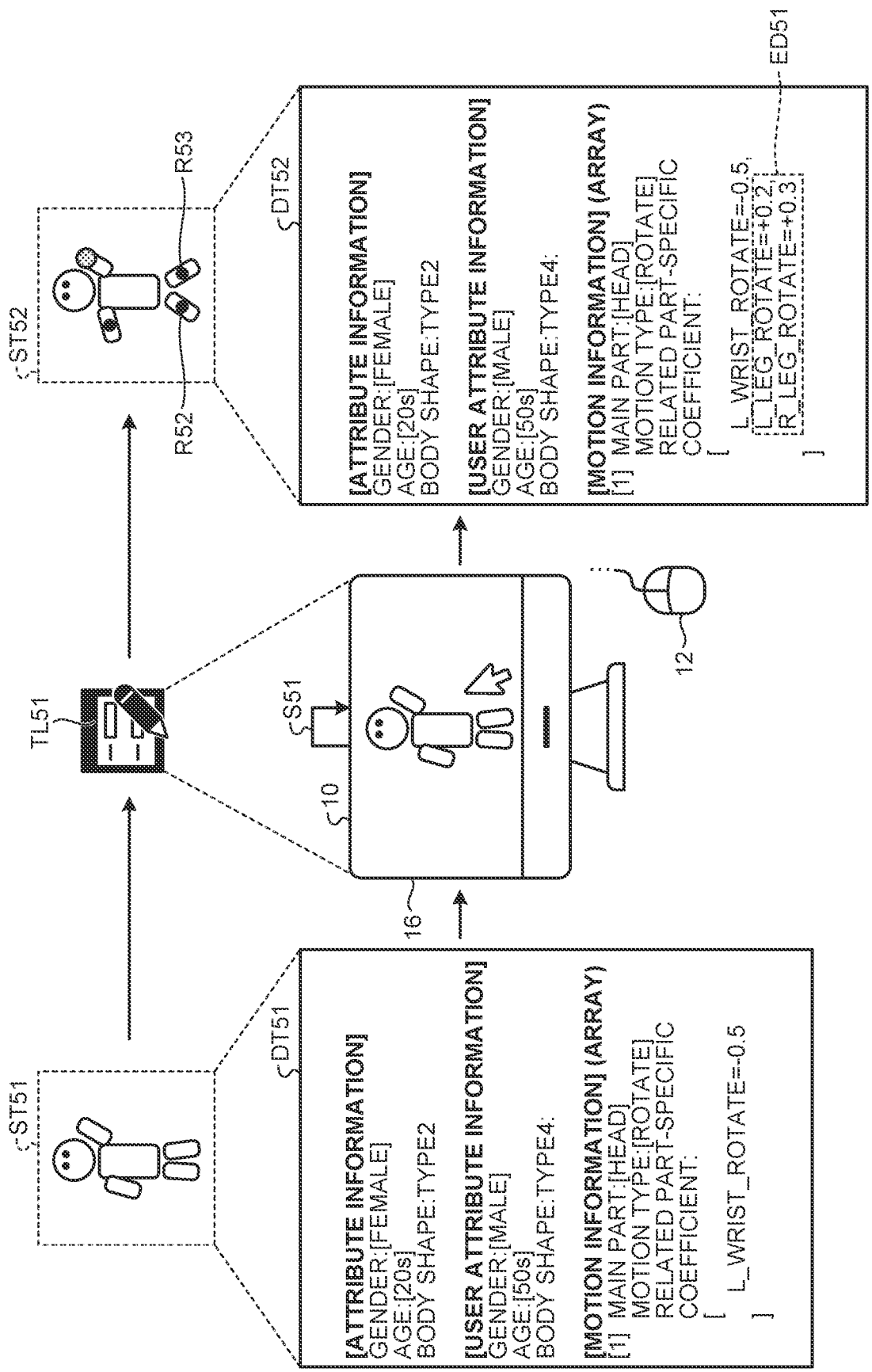
FIG. 14 is a view illustrating an example of motion editing.

Furthermore, for example, the information processing device 100A may use history information of motion editing. This point will be described with reference to FIG. 14. FIG. 14 is a view illustrating an example of motion editing. Hereinafter, as an example of the use case, a case where motion data that is not predefined is acquired will be described. In FIG. 14, an example of a method of automatically acquiring "main part/related part information" to be an information source for canceling/controlling/emphasizing a motion of a body part is illustrated, for example.

The information processing device 100A acquires motion data expected from a motion editing history of an avatar. In a case where there is a function of correcting a motion of the avatar as an editing tool of content for a social networking service (SNS) or the like, the information processing device 100A acquires history information corrected (edited) by the function. Furthermore, the information processing device 100A may acquire information from completed data generated by an editing (PC or the like) operation after photographing. For example, the information processing device 100A may acquire a difference between data before editing (raw data) and data after the editing (completed data) as editing information.

In FIG. 14, a case where the raw data is edited and the completed data is generated by operation by the user U1 on the input unit 12 such as a mouse of the terminal device 10 is illustrated as an example. In FIG. 14, the user U1 edits motion information by operating a model, which imitates a person and is displayed on the display unit 16 of the terminal device 10, by using a predetermined editing tool TL51 (Step S51). Note that the user U1 may directly edit character information in a manner illustrated in data DT51.

The user U1 generates data DT52 corresponding to a state ST52 by editing the data DT51 corresponding to a state ST51. As a result, by editing the data DT51 that is the raw data, the user U1 generates the data DT52 that is the completed data. For example, the information processing device 100A generates the data DT52 by adding editing information ED51 corresponding to the editing by the user U1 to the data DT51. The information processing device 100A generates the data DT52 in which the motions of the right leg RL and the left leg LL that are the related parts R52 and R53 are edited. For example, the information processing device 100A adds the right leg RL and the left leg LL to related parts of the motion information in response to the adjustment of the motions of the right leg RL and the left leg LL by the user U1.

The information processing device 100A acquires the editing history in the manner described above, and corrects the data by using the acquired editing history. The information processing device 100A corrects the motion information of the virtual character by using the editing history. The information processing device 100A corrects the motion information of the virtual character by using a tendency of past correction included in the editing history. For example, the information processing device 100A may automatically generate completed data from raw data automatically generated in an early stage.

3. Other Embodiments

The processing according to each of the above-described embodiments may be performed in various different forms (modification examples) other than each of the above-described embodiments and modification examples.

3-1. Other Configuration Examples

Note that although a case where the information processing device 100 or the information processing device 100A and the terminal device 10 are separate bodies has been described, these devices may be integrated. That is, a device that generates content (such as information processing device 100) and a device that displays information such as the content (such as terminal device 10) may be integrated. For example, a device used by the user may be an information processing device having a function of generating content, and a function of performing a display of information and reception of an input by the user. In this case, for example, the information processing device may be a television or the like. The information processing device may acquire input information of the user from a terminal device (such as smart speaker or smartphone) that receives an input by the user, and may generate and display content by using the acquired information.

3-2. Others

Also, among the pieces of processing described in the above embodiments, all or a part of the processing described to be automatically performed can be manually performed, or all or a part of the processing described to be manually performed can be automatically performed by a known method. In addition, a processing procedure, specific name, and information including various kinds of data and parameters illustrated in the above document or drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

Also, the above-described embodiments and modification examples can be arbitrarily combined in a range in which the processing contents do not contradict each other.

Also, the effect described in the present description is merely an example and is not a limitation, and there may be another effect.

4. Effects According to the Present Disclosure

As described above, the information processing device according to the present disclosure (information processing device 100 or 100A in the embodiment) includes an acquisition unit (acquisition unit 131 or 131A in the embodiment) and a specification unit (specification unit 132 or 132A in the embodiment). The acquisition unit acquires outline information indicating an outline of a user who makes a body motion. On the basis of outline information acquired by the acquisition unit, the specification unit specifies, among body parts, a main part corresponding to the body motion and a related part to be a target of correction processing of motion information corresponding to the body motion.

In such a manner, on the basis of the outline information indicating the outline of the user who makes the body motion, the information processing device according to the present disclosure specifies, among the body parts, the main part corresponding to the body motion and the related part to be the target of the correction processing of the motion information corresponding to the body motion. As a result, the information processing device can appropriately specify a part related to the body motion of the user by specifying the main part that is a main part of the user, and a part that is another part and is to be the target of the correction processing.

Also, the acquisition unit acquires the outline information detected by a sensor. Thus, the information processing device can appropriately specify the part related to the body motion of the user by using the information detected by the sensor (sensor information).

Furthermore, the acquisition unit acquires the outline information that is image information detected by an image sensor. As a result, the information processing device can appropriately specify the part related to the body motion of the user by using information (image) detected by the image sensor.

Furthermore, the specification unit specifies a related part to be a target for cancelation of an influence of the body motion. As a result, the information processing device can appropriately specify the part related to the body motion of the user by specifying the related part to be the target of the cancellation of the influence of the body motion.

Furthermore, the specification unit specifies the related part to be a target of emphasis of the influence of the body motion. As a result, the information processing device can appropriately specify the part related to the body motion of the user by specifying the related part to be the target of the emphasis of the influence of the body motion.

Furthermore, the specification unit specifies the main part on the basis of a conversion amount of a position of each body part of the user. As a result, the information processing device can appropriately specify the part related to the body motion of the user by specifying the main part according to the conversion amount of the position of each body part of the user.

Furthermore, the specification unit specifies, as the main part, a body part having a large conversion amount of the position. As a result, the information processing device can appropriately specify the part related to the body motion of the user by specifying, as the main part, the part having the large conversion amount of the position.

Furthermore, the acquisition unit acquires speech information of the user. The specification unit specifies the main part on the basis of the speech information of the user. As a result, the information processing device can appropriately specify the part related to the body motion of the user more accurately by specifying the main part by using the outline information and the speech information.

Furthermore, the specification unit specifies the related part on the basis of the speech information of the user. As a result, the information processing device can appropriately specify the part related to the body motion of the user more accurately by specifying the related part on the basis of the speech information of the user by using the outline information and the speech information.

Furthermore, the specification unit specifies the main part on the basis of speech intent of the user which intent is estimated from speech contents of the user. As a result, the information processing device can appropriately specify the part related to the body motion of the user more accurately by specifying the main part according to the speech intent of the user which intent is estimated from the speech contents of the user.

Furthermore, the specification unit specifies, as the related part, a moving part among parts other than the main part corresponding to the speech intent of the user. As a result, the information processing device can appropriately specify the part related to the body motion of the user more accurately by specifying, as the related part, the moving part other than the part corresponding to the speech intent of the user.

Furthermore, the acquisition unit acquires definition information indicating association between the main part and the related part. The specification unit specifies the related part on the basis of the definition information. As a result, the information processing device can appropriately specify the part related to the body motion of the user more accurately by specifying the main part by using definition information indication the association between the main part and the related part.

Furthermore, the acquisition unit acquires the outline information of the user who performs an input by the body motion. The specification unit specifies the main part corresponding to the input by the user. As a result, the information processing device can appropriately specify the part related to the body motion of the user who performs the input by the body motion.

Furthermore, the specification unit specifies, as the related part, a part that moves along with the motion of the main part. As a result, the information processing device can appropriately specify the part related to the body motion of the user more accurately by specifying, as the related part, the part that moves along with the motion of the main part.

Furthermore, the acquisition unit acquires the outline information of the user who moves the virtual character by the body motion. The specification unit specifies a main part corresponding to the motion of the virtual character and a related part to be a target of correction processing. As a result, the information processing device can appropriately specify the part related to the body motion of the user who moves the virtual character by the body motion.

Furthermore, the acquisition unit acquires motion information of a corresponding user corresponding to an attribute set for the virtual character as information used for generation of motion information of the virtual character. As a result, by using the motion information of the user corresponding to the attribute set for the virtual character, the information processing device can cause the virtual character to move by using the motion information of the user similar to the virtual character.

Furthermore, the acquisition unit acquires an editing history related to the motion of the virtual character as information used for a correction of the motion information of the virtual character. As a result, the information processing device can correct the motion information of the virtual character by using the editing history related to the motion of the virtual character, and can cause the virtual character to move by using a tendency of past correction.

Furthermore, the information processing device according to the present disclosure further includes a correction unit (correction unit 133 or 133A in the embodiment). The correction unit corrects the motion information corresponding to the related part specified by the specification unit. Thus, the information processing device can appropriately correct the motion information of the related part of the body motion of the user.

Furthermore, the correction unit corrects the motion information corresponding to the main part specified by the specification unit. Thus, the information processing device can appropriately correct the motion information of the main part of the body motion of the user.

5. Hardware Configuration

Figure 15:
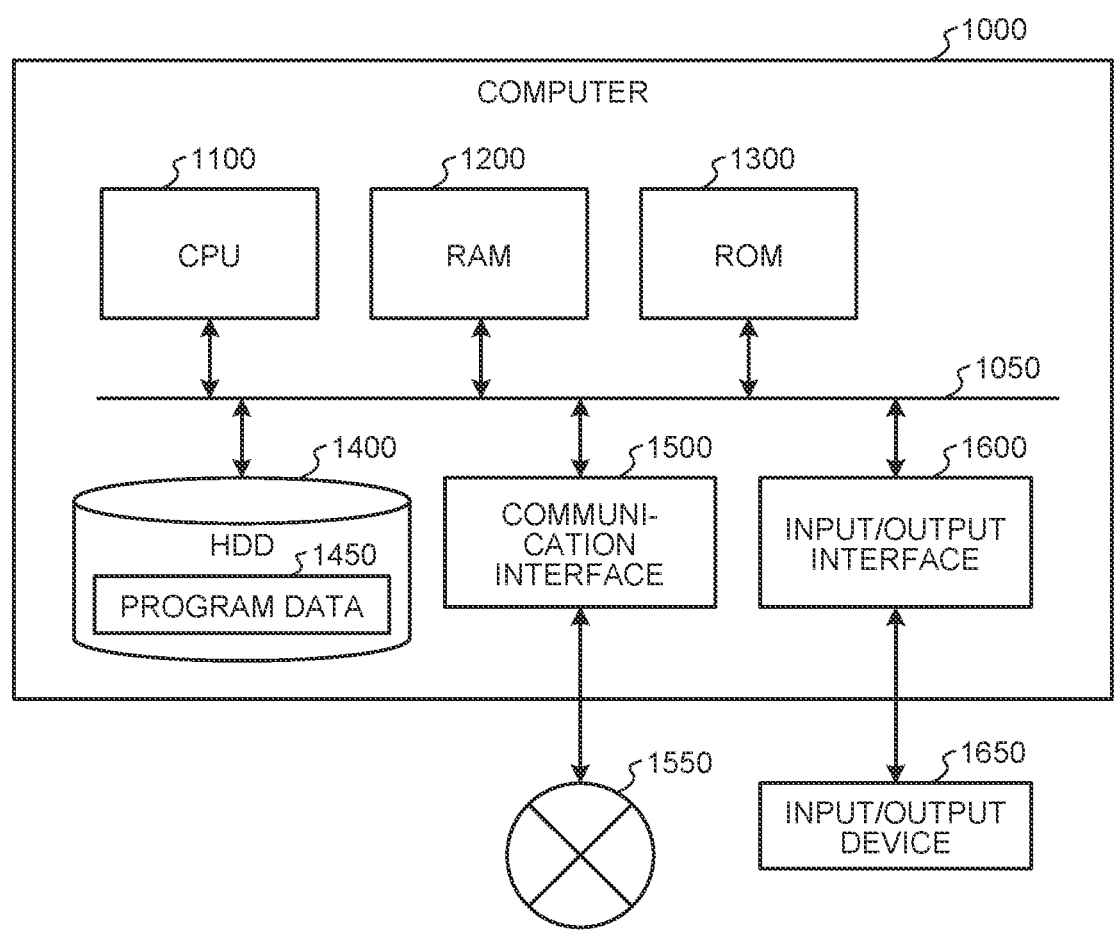
FIG. 15 is a hardware configuration diagram illustrating an example of a computer that realizes the information processing device, or functions of the information processing device.

Information equipment such as the information processing device 100 or 100A, or the terminal device 10 according to each of the above-described embodiments is realized by, for example, a computer 1000 having a configuration in a manner illustrated in FIG. 15. FIG. 15 is a hardware configuration diagram illustrating an example of the computer 1000 that realizes functions of the information processing device such as the information processing device 100 or 100A, or the terminal device 10. In the following, the information processing device 100 according to the first embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. More specifically, the HDD 1400 is a recording medium that records the information processing program according to the present disclosure which program is an example of program data 1450.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a keyboard or mouse via the input/output interface 1600. Furthermore, the CPU 1100 transmits data to an output device such as a display, speaker, or printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the first embodiment, the CPU 1100 of the computer 1000 realizes a function of the control unit 130 or the like by executing the information processing program loaded on the RAM 1200. Also, the HDD 1400 stores an information processing program according to the present disclosure, and data in the storage unit 120. Note that the CPU 1100 reads the program data 1450 from the HDD 1400 and performs execution thereof, but may acquire these programs from another device via the external network 1550 in another example.

Note that the present technology can also have the following configurations.

(1)
An information processing device comprising:
an acquisition unit that acquires outline information indicating an outline of a user who makes a body motion; and
a specification unit that specifies, among body parts, a main part corresponding to the body motion and a related part, which is to be a target of correction processing of motion information corresponding to the body motion, on a basis of the outline information acquired by the acquisition unit.

(2)
The information processing device according to (1), wherein
the acquisition unit
acquires the outline information detected by a sensor.

(3)
The information processing device according to (2), wherein
the acquisition unit
acquires the outline information that is image information detected by an image sensor.

(4)
The information processing device according to any one of (1) to (3), wherein
the specification unit
specifies the related part to be a target of cancellation of an influence of the body motion.

(5)
The information processing device according to any one of
(1) to (3), wherein
the specification unit
specifies the related part to be a target of emphasis of an influence of the body motion.

(6)
The information processing device according to any one of
(1) to (5), wherein
the specification unit
specifies the main part on a basis of a conversion amount of a position of each of the body parts of the user.

(7)
The information processing device according to (6), wherein
the specification unit
specifies, as the main part, a part having a large conversion amount of a position among the body parts.

(8)
The information processing device according to any one
of (1) to (7), wherein
the acquisition unit
acquires speech information of the user, and
the specification unit
specifies the main part on a basis of the speech information of the user.

(9)
The information processing device according to (8), wherein
the specification unit
specifies the related part on a basis of the speech information of the user.

(10)
The information processing device according to (8) or (9), wherein
the specification unit
specifies the main part on a basis of speech intent of the user which intent is estimated from speech contents of the user.

(11)
The information processing device according to (10), wherein
the specification unit
specifies, as the related part, a moving part among parts other than the main part corresponding to the speech intent of the user.

(12)
The information processing device according to any one
of (1) to (11), wherein
the acquisition unit
acquires definition information indicating association between the main part and the related part, and
the specification unit
specifies the related part on a basis of the definition information.

(13)
The information processing device according to any one
of (1) to (12), wherein
the acquisition unit
acquires the outline information of the user who performs an input by the body motion, and
the specification unit
specifies the main part corresponding to the input by the user.

(14)
The information processing device according to (13), wherein
the specification unit
specifies, as the related part, a part that moves along with a motion of the main part.

(15)

The information processing device according to any one of (1) to (14), wherein the acquisition unit acquires the outline information of the user who moves a virtual character by the body motion, and the specification unit specifies the main part corresponding to a motion of the virtual character, and the related part to be the target of the correction processing.

(16)

The information processing device according to (15), wherein the acquisition unit acquires, as information used for generation of motion information of the virtual character, motion information of a corresponding user corresponding to an attribute that is set for the virtual character.

(17)

The information processing device according to (15) or (16), wherein the acquisition unit acquires, as information used for a correction of motion information of the virtual character, an editing history related to the motion of the virtual character.

(18)

The information processing device according to any one of (1) to (17), further comprising a correction unit that corrects the motion information corresponding to the related part specified by the specification unit.

(19)

The information processing device according to (18), wherein the correction unit corrects the motion information corresponding to the main part specified by the specification unit.

(20)

An information processing method comprising:

executing processing of acquiring outline information indicating an outline of a user who makes a body motion, and specifying, among body parts, a main part corresponding to the body motion and a related part, which is to be a target of correction processing of information corresponding to the body motion, on a basis of the acquired outline information.

REFERENCE SIGNS LIST

1 INFORMATION PROCESSING SYSTEM
100, 100A INFORMATION PROCESSING DEVICE
110 COMMUNICATION UNIT
120, 120A STORAGE UNIT
121 MOTION INFORMATION STORAGE UNIT
122 USER INFORMATION STORAGE UNIT
123 PART INFORMATION STORAGE UNIT
124 FUNCTION INFORMATION STORAGE UNIT
125 CONTENT GENERATING INFORMATION STORAGE UNIT
130, 130A CONTROL UNIT
131 ACQUISITION UNIT
132 SPECIFICATION UNIT
133, 133A CORRECTION UNIT
134, 134A EXECUTION UNIT
135 TRANSMISSION UNIT
10 TERMINAL DEVICE
11 COMMUNICATION UNIT
12 INPUT UNIT
13 OUTPUT UNIT
14 STORAGE UNIT
15 CONTROL UNIT
151 RECEIVING UNIT
152 EXECUTION UNIT
153 RECEPTION UNIT
154 TRANSMISSION UNIT
16 DISPLAY UNIT

The invention claimed is:

1. An information processing device, comprising:

circuitry configured to:

acquire, from a terminal device, outline information indicating a user outline, wherein the outline information includes image information that indicates a body motion;

acquire a plurality of pieces of motion information corresponding to the body motion;

specify, among a plurality of body parts, a main part corresponding to the body motion and a related part corresponding to the body motion, wherein the specification of each of the main part and the related part is based on the outline information, the specified related part is a target of correction processing of the plurality of pieces of motion information, and the plurality of pieces of motion information includes first motion information corresponding to the specified related part;

correct the first motion information corresponding to the specified related part; and control, based on the corrected first motion information, the terminal device to execute a specific function associated with the body motion.

2. The information processing device according to claim 1, wherein the terminal device includes a sensor that detects the outline information, and the circuitry is further configured to acquire the detected outline information.

3. The information processing device according to claim 2, wherein the terminal device includes an image sensor that detects the image information, and the circuitry is further configured to acquire the outline information that includes the detected image information.

4. The information processing device according to claim 1, wherein the specified related part is further a target of cancellation of an influence of the body motion.

5. The information processing device according to claim 1, wherein the specified related part is further a target of emphasis of an influence of the body motion.

6. The information processing device according to claim 1, wherein the circuitry is further configured to specify the main part based on a conversion amount of a position of each body part of the plurality of body parts.

7. The information processing device according to claim 6, wherein the circuitry is further configured to specify, as the main part, a part that has a largest conversion amount of a position among the plurality of body parts.

8. The information processing device according to claim 1, wherein the circuitry is further configured to:

acquire user speech information; and specify the main part based on the user speech information.

9. The information processing device according to claim 8, wherein the circuitry is further configured to specify the related part based on the user speech information.

10. The information processing device according to claim 8, wherein the circuitry is further configured to:
estimate user speech intent based on user speech content associated with the user speech information; and
specify the main part based on the estimated user speech intent.

11. The information processing device according to claim 10, wherein the circuitry is further configured to:
identify a set of moving parts of the plurality of body parts, wherein
each moving part of the set of moving parts is different from the main part, and
the main part corresponds to the user speech intent; and
specify, as the related part, a moving part among the set of moving parts.

12. The information processing device according to claim 1, wherein the circuitry is further configured to:
acquire definition information indicating association between the main part and the related part; and
specify the related part based on the definition information.

13. The information processing device according to claim 1, wherein the circuitry is further configured to:
acquire the outline information that includes a user input, wherein the user input corresponds to the body motion; and
specify the main part corresponding to the user input.

14. The information processing device according to claim 13, wherein the circuitry is further configured to specify, as the related part, a part, of the plurality of body parts, that moves along with a motion of the main part.

15. The information processing device according to claim 1, wherein the circuitry is further configured to:
acquire the outline information of a user, wherein the user moves a virtual character by the body motion; and
specify each of:
the main part corresponding to a motion of the virtual character, and
the related part that is the target of the correction processing.

16. The information processing device according to claim 15, wherein the circuitry is further configured to:
set an attribute for the virtual character;
acquire second motion information, of the user, that corresponds to the set attribute, wherein the plurality of pieces of motion information includes the second motion information; and
generate, based on the second motion information, motion information of the virtual character.

17. The information processing device according to claim 15, wherein the circuitry is further configured to:
acquire an editing history related to the motion of the virtual character; and
correct, based on the acquired editing history, motion information of the virtual character.

18. The information processing device according to claim 1, wherein
the plurality of pieces of motion information includes second motion information corresponding to the specified main part, and
the circuitry is further configured to correct the second motion information corresponding to the specified main part.

19. An information processing method, comprising:
acquiring, from a terminal device, outline information indicating a user outline, wherein the outline information includes image information that indicates a body motion;
acquiring a plurality of pieces of motion information corresponding to the body motion;
specifying, among a plurality of body parts, a main part corresponding to the body motion and a related part corresponding to the body motion, wherein
the specification of each of the main part and the related part is based on the acquired outline information,
the specified related part is a target of correction processing of the plurality of pieces of motion information, and
the plurality of pieces of motion information includes motion information corresponding to the specified related part;
correcting the motion information corresponding to the specified related part; and
controlling, based on the corrected motion information, the terminal device to execute a specific function associated with the body motion.

20. An information processing device, comprising:
circuitry configured to:
acquire, from a terminal device, outline information indicating a user outline, wherein the outline information includes image information that indicates a body motion;
acquire motion information corresponding to the body motion;
acquire user speech information;
specify, among a plurality of body parts, a main part corresponding to the body motion and a related part corresponding to the body motion, wherein
the specification of the main part is based on the acquired outline information and the acquired user speech information,
the specification of the related part is based on the acquired outline information, and
the specified related part is a target of correction processing of the motion information; and
control, based on each of the motion information, the specified main part, and the specified related part, the terminal device to execute a specific function associated with the body motion.

* * * * *